(12) United States Patent
Barrow et al.

(10) Patent No.: US 7,623,217 B2
(45) Date of Patent: Nov. 24, 2009

(54) TOOL FOR USE IN AFFIXING AN OPTICAL COMPONENT TO A LIQUID CRYSTAL DISPLAY (LCD)

(75) Inventors: William A. Barrow, Beaverton, OR (US); Maria E. Crouser, Portland, OR (US); Wayne Patrick Gentry, Portland, OR (US); Andrew Mitchell Robinson, Fairview, OR (US)

(73) Assignee: Via Optronics, LLC, Hillsboro, OR (US)

( * ) Notice: Subject to any disclaimer, the term of this patent is extended or adjusted under 35 U.S.C. 154(b) by 566 days.

(21) Appl. No.: 11/487,174

(22) Filed: Jul. 14, 2006

(65) Prior Publication Data

US 2007/0024803 A1    Feb. 1, 2007

Related U.S. Application Data

(60) Provisional application No. 60/699,083, filed on Jul. 14, 2005.

(51) Int. Cl.
*G02F 1/13*    (2006.01)
(52) U.S. Cl. .................. 349/192; 349/74; 349/117; 349/119; 349/187; 349/193

(58) Field of Classification Search ............ 349/73, 349/74, 117, 119, 187, 192, 193
See application file for complete search history.

(56) References Cited

U.S. PATENT DOCUMENTS

| 5,867,241 | A | 2/1999 | Sampica et al. |
| 6,388,724 | B1 | 5/2002 | Campbell et al. |

*Primary Examiner*—Jennifer Doan
(74) *Attorney, Agent, or Firm*—Alleman Hall McCoy Russell & Tuttle LLP

(57) ABSTRACT

A tool for use in affixing an optical component, such as glass, to a liquid crystal display (LCD) using a silicone gel mixture includes, in one embodiment, a unitary metallic platen that is shaped to define a central window. A narrow shelf is defined around the central window to support the optical component during the application of the silicone gel thereon. A upwardly extending partition is formed onto the top surface of the platen around the shelf to retain the optical component fixed in place on the platen during the assembly process. A plurality of identical, spaced apart, upwardly extending standoffs are formed onto the free end of the partition to support the LCD a fixed distance away from the optical component. In this manner, the standoffs ensure that the layer of silicone gel deposited between the optical component and the LCD is uniform in thickness to optimize performance.

15 Claims, 26 Drawing Sheets

TOOL FOR USE IN AFFIXING AN OPTICAL COMPONENT TO A LIQUID CRYSTAL DISPLAY (LCD)

CROSS-REFERENCE TO RELATED APPLICATIONS

The present application claims the benefit under 35 U.S.C. 119(e) of U.S. provisional Patent Application Ser. No. 60/699,083, filed Jul. 14, 2005, the disclosure of which is incorporated herein by reference.

BACKGROUND OF THE INVENTION

The present invention relates generally to liquid crystal displays, and more particularly, to a tool for use in affixing an optical component to a liquid crystal display.

Liquid crystal displays (LCDs) are well-known in the art and typically include a liquid crystal material that is sandwiched between a substrate and a filter, both the substrate and filter being traditionally constructed of glass.

In order to enhance or alter the performance of an LCD, additional optical components are often affixed to the substrate and/or filter of an LCD, the resultant product being commonly referred to as an LCD stack-up in the art. Examples of the types of additional optical components that are commonly affixed to an LCD to create an LCD stack-up include, but are not limited to, glass plates, diffusers, rigid compensators, heaters, and flexible films such as polarizers, retarders and dry film adhesives.

It is well known in the art for a transparent adhesive to be used to affix additional optical components to a liquid crystal display to create an LCD stack-up. For example, in U.S. Pat. No. 5,867,241 to J. D. Sampica et al. (hereinafter the '241 patent), which is incorporated herein by reference, there is disclosed an assembly fixture which is designed to assist in the application of a layer of silicone gel between a liquid crystal display and a first optical component. Once exposed to heat at a temperature of 80° C. for a period of 48 hours, the silicone gel cures which, in turn, serves to the attach the first optical component to the liquid crystal display with minimal strain imparted onto the liquid crystal display.

Although well known in the art, assembly fixtures of the type described in the '241 patent include a notable design shortcoming. Specifically, assembly fixtures of the type described in the '241 patent include no means for ensuring that the layer of silicone gel is deposited between the liquid crystal display and the additional optical component in a uniform manner. As can be appreciated, it has been found that the application of a non-uniform layer of silicone gel between the liquid crystal display and additional optical components ultimately compromises the performance of the resultant LCD stack-up, which is highly undesirable.

Accordingly, in U.S. Pat. No. 6,388,724 to M. L. Campbell et al. (hereinafter the '724 patent), which is incorporated herein by reference, there is disclosed a fixture for laminating an LCD to an additional optical component using silicone gel that includes a plurality of standoffs. In use, the plurality of standoffs serve to maintain adequate spacing between the LCD and the additional optical component to the extent necessary to ensure uniformity of the layer of silicone gel.

SUMMARY OF THE INVENTION

It is an object of the present invention to provide a new and improved tool for use in affixing an optical component to a liquid crystal display.

It is another object of the present invention to provide a tool of the type as described above which facilitates the application of a uniform layer of bonding material between the optical component to the liquid crystal display.

It is yet still another object of the present invention to provide a tool as described above which includes a limited number of parts, which is inexpensive to manufacture and which is easy to use.

Accordingly, as one feature of the present invention, there is provided a tool for use in affixing an optical component to a liquid crystal display using a silicone gel, the tool comprising (a) a frame shaped to define a central window, the frame comprising (i) a top surface, (ii) a bottom surface, (iii) a upwardly extending partition formed on the top surface around the outer periphery of the central window, the partition being spaced slightly away from the outer periphery of the central window so as to define a narrow shelf which is adapted to support the optical component, and (iv) a plurality of upwardly extending standoffs formed onto the free end of the partition, the plurality of standoffs extending up from the partition the same distance, the plurality of standoffs being adapted to support the liquid crystal display, and (b) plurality of alignment posts coupled to the frame.

As another feature of the present invention, there is provided tool for use in manufacturing a liquid crystal display (LCD) stack-up, the LCD stack-up comprising a front glass and a rear glass that are affixed onto opposing surfaces of an LCD using silicone gel, the tool comprising (a) a frame shaped to define a central window, the frame including a top surface and a bottom surface, the top surface being shaped to define a narrow shelf around the outer periphery of the central window, the narrow shelf being adapted to support the front glass, (b) a first set of pivots pivotally coupled to the frame, each of the first set of pivots capable of being rotated between a first position and a second position, and (c) a first shim coupled to each of the first set of pivots, each of the first shims protruding into the central window a predefined distance above the front glass when its corresponding pivot is disposed in its first position.

As another feature of the present invention, there is provided tool for use in affixing an optical component to a liquid crystal display using a silicone gel, the tool comprising (a) a frame shaped to define a central window, the frame comprising (i) a top surface, (ii) a bottom surface, and (iii) a plurality of tabs that extend partially into the central window, each tab comprising a step that is adapted to support the optical component, and (b) a plurality of alignment posts coupled to the frame.

Various other features and advantages will appear from the description to follow. In the description, reference is made to the accompanying drawings which form a part thereof, and in which is shown by way of illustration, various embodiments for practicing the invention. The embodiments will be described in sufficient detail to enable those skilled in the art to practice the invention, and it is to be understood that other embodiments may be utilized and that structural changes may be made without departing from the scope of the invention. The following detailed description is therefore, not to be taken in a limiting sense, and the scope of the present invention is best defined by the appended claims.

BRIEF DESCRIPTION OF THE DRAWINGS

In the drawings wherein like reference numerals represent like parts.

DETAILED DESCRIPTION OF THE PREFERRED EMBODIMENT

Figure 1A:
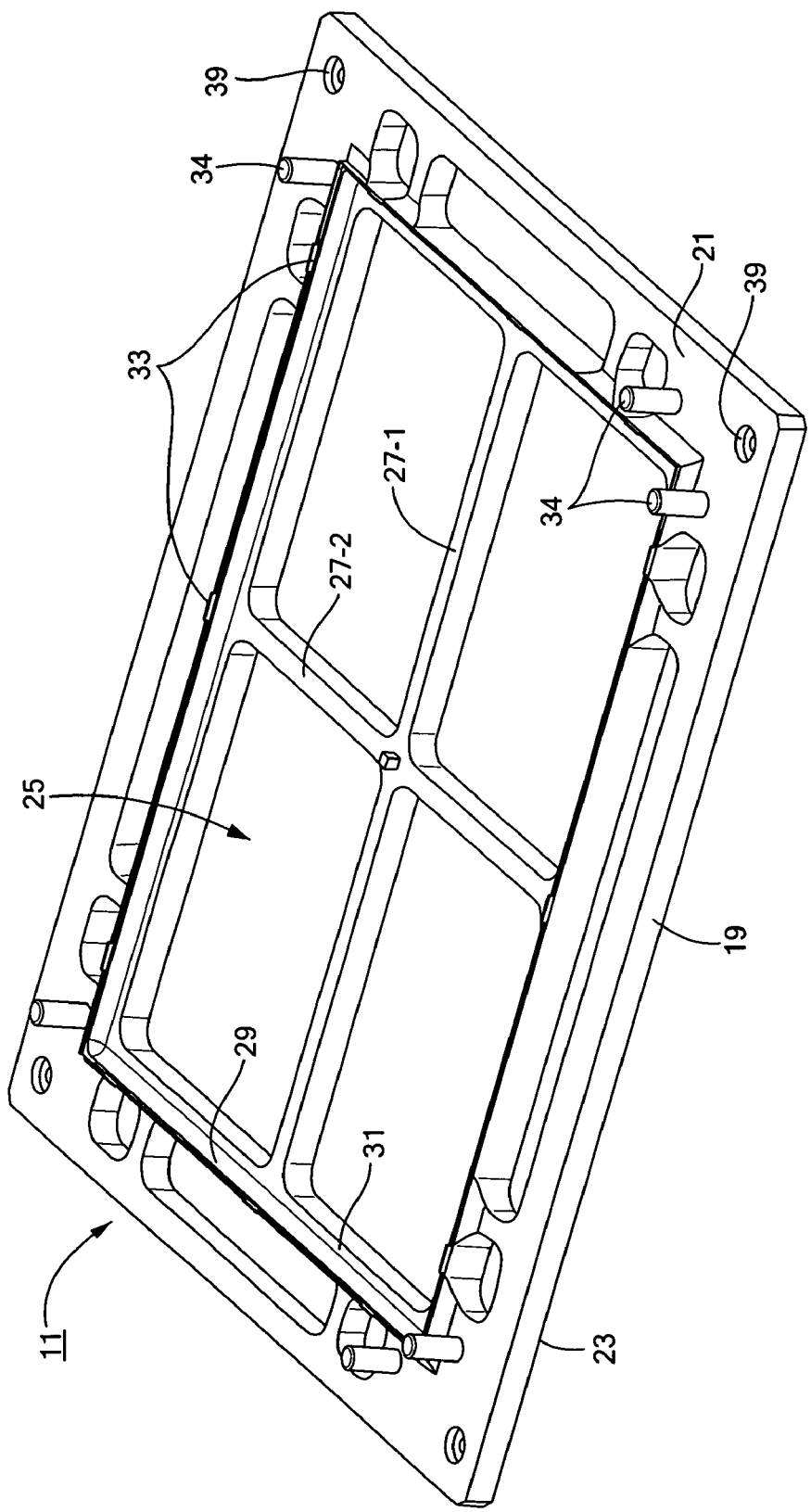
FIG. 1(a) is a top perspective view of a first embodiment of a high volume glass lamination (HVGL) tool that is constructed according to the teachings of the present invention.
Figure 1B:
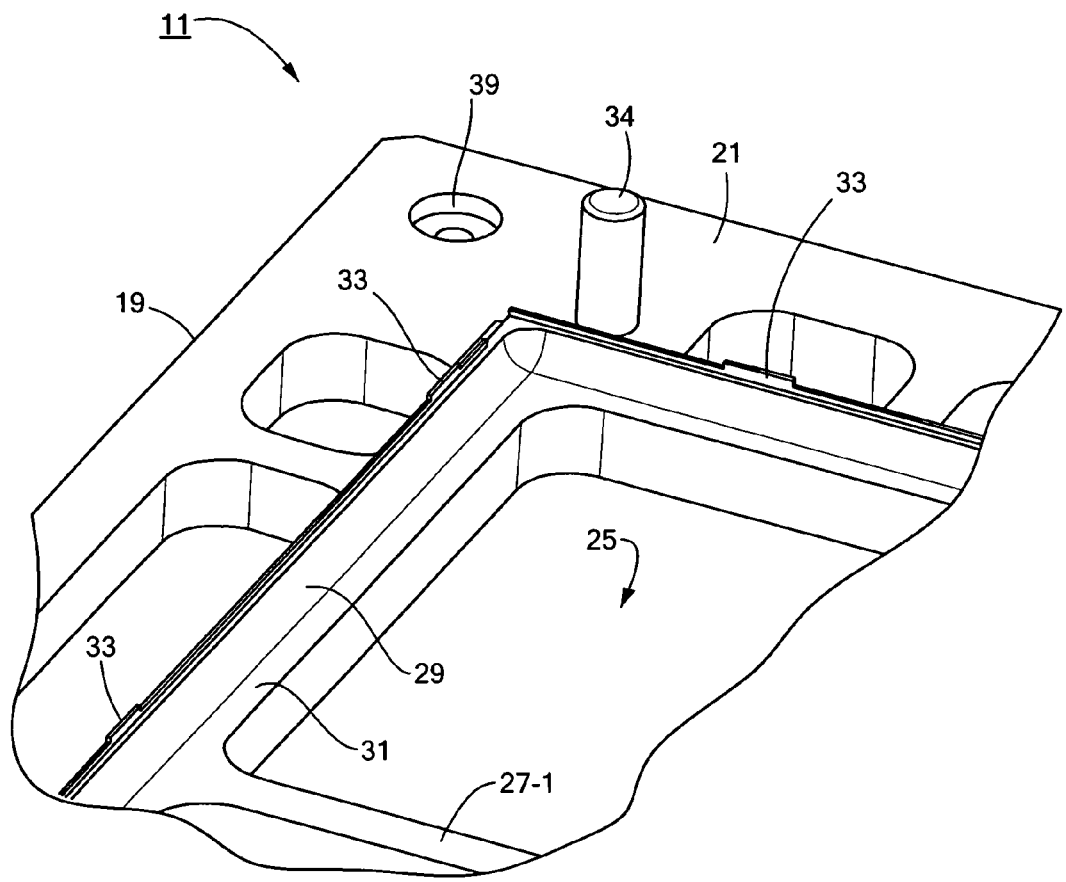
FIG. 1(b) is an enlarged, fragmentary, top perspective view of the tool shown in FIG. 1(a)
Figure 1C:
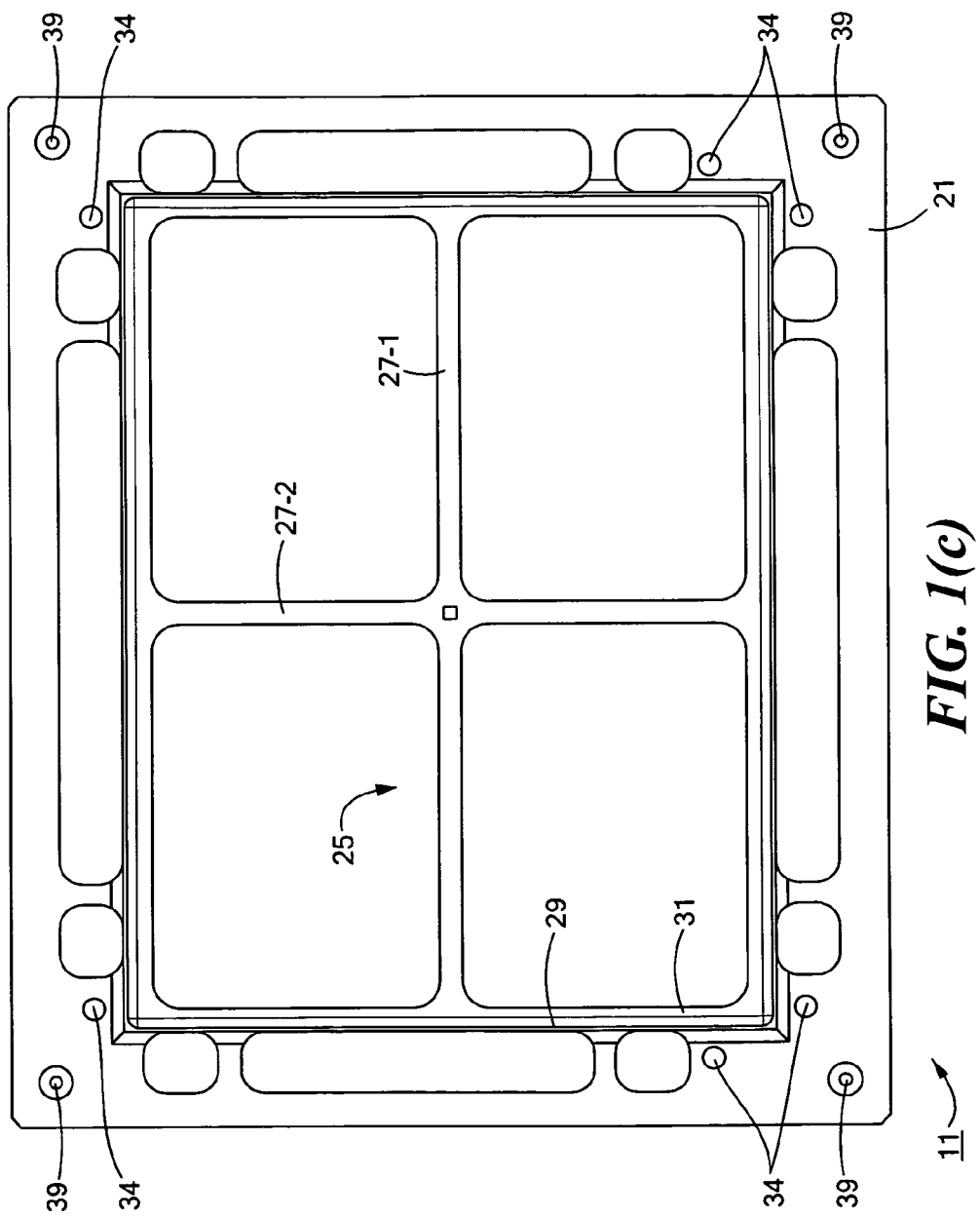
FIG. 1(c) is a top plan view of the tool shown in FIG. 1(a)
Figure 1D:
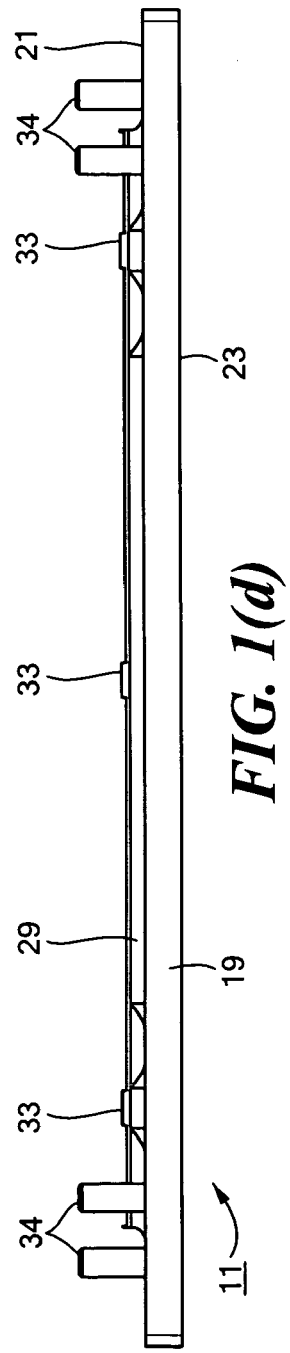
FIG. 1(d) is a front plan view of the tool shown in FIG. 1(a)
Figure 1E:
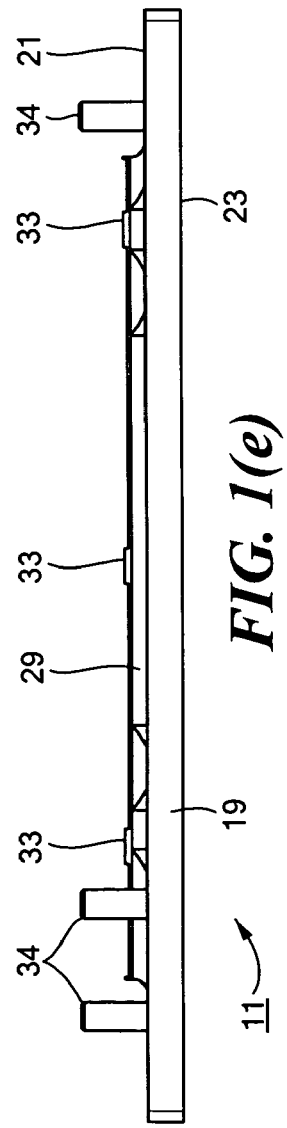
FIG. 1(e) is a right side plan view of the tool shown in FIG. 1(a)

Referring now to FIG. 1(a)-(e), there are shown various views of a first embodiment of a high volume glass lamination (HVGL) tool that is constructed according to the teachings of the present invention, the tool being identified generally by reference numeral 11. As will be described in greater detail below, tool 11 is designed to assist in the process of affixing an optical component 13 to a liquid crystal display (LCD) 15 using a silicone gel 17 to create an LCD stack-up 18, a simplified section view of LCD stack-up 18 being shown in FIG. 2.

Figure 2:
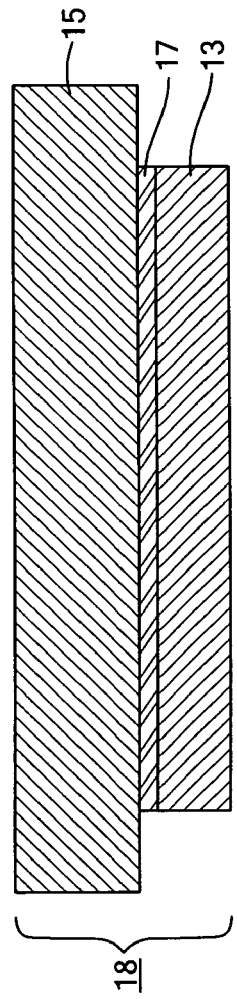
FIG. 2 is a simplified section view of a liquid crystal display (LCD) stack-up constructed using the tool shown in FIG. 1(a)

As seen most clearly in FIG. 1(a), tool 11 comprises a rigid and durable frame, or platen, 19 that is preferably constructed out of metal, such as a nickel-plated aluminum, frame 19 being approximately 12.00 inches in length, 10.00 inches in width and 0.31 inches in thickness. Frame 19 includes a substantially flat top surface 21 and a substantially flat bottom surface 23.

Frame 19 is shaped to define an enlarged, substantially rectangular, central window, or opening, 25. A pair of narrow support bars 27-1 and 27-2 are integrally formed onto frame 19 and extend transversely across window 25 in an orthogonal relationship to one another. As will be described in greater detail below, bars 27 serve to support optical component 13 within window 25 during the process of affixing an LCD 15 thereto.

A thin, four-sided sidewall, or partition, 29 is formed onto top surface 21 of frame 19 immediately surrounding the outer periphery of window 25 and extends orthogonally upward approximately 0.135 inches. As seen most clearly in FIG. 1(b), sidewall 29 is spaced a slight, uniform distance away from window 25 so as to define a narrow shelf 31 which, in combination with support bars 27, is designed to support optical component 13 during the process of manufacturing LCD stack-up 18.

A plurality of spaced apart, upwardly extending standoffs, or tabs, 33 are integrally formed onto the free end of sidewall 29, each standoff 33 extending orthogonally away from sidewall 29 a height of approximately 0.057 inches. As will be described further in detail below, standoffs 33 serve to space apart LCD 15 a uniform, predetermined distance apart from optical component 13 as the silicone gel 17 deposited therebetween cures.

It should be noted that tool 11 is represented herein as comprising twelve separate standoffs 33, with three spaced apart standoffs 33 located along each of the four sides of partition 29. However, it is to be understood that the number and configuration of standoffs 33 on sidewall 29 could be modified without departing from the spirit of the present invention.

Tool 11 additionally includes a plurality of generally cylindrical posts, or dowel pins, 34 which are press fit into corresponding holes that are preformed into frame 19 in a particular configuration. As seen in FIG. 1(a), each post 34 is fixedly mounted in frame 19 in such a manner so as to extend orthogonally away from top surface 21. Each post 34 is preferably constructed out of stainless steel and has a diameter of approximately 0.25 inches and a length of approximately 0.875 inches. As will be described further below, posts 34 serve to align LCD 15 in its proper position relative to optical component 13 during the assembly process for LCD stack-up 18.

Figure 3A:
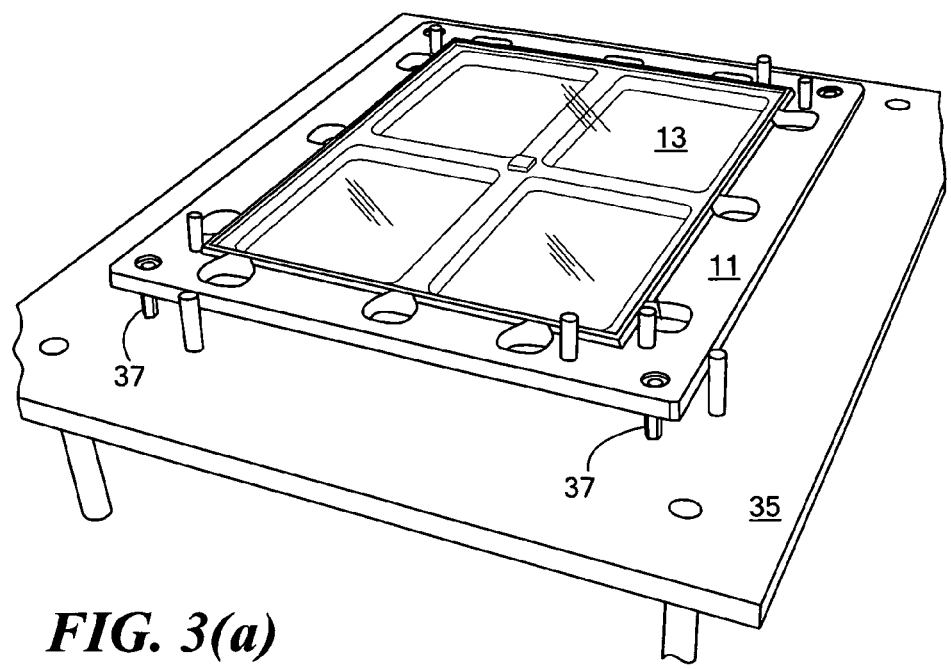
FIG. 3(a)-(g) are selected views which are useful in understanding the method of constructing a liquid crystal display using the tool shown in FIG. 1(a)

In use, tool 11 may be used in the following manner to assist in the process of affixing an optical component 13 to a liquid crystal display (LCD) 15 using a silicone gel 17 to create an LCD stack-up 18. Specifically, referring now to FIG. 3(a), optical component 13 (e.g., glass) is positioned, coated side down, within window 25 of tool 11. It should be noted that optical component 13 is preferably sized and shaped to align directly inside upwardly extending partition 29, with optical component 13 being supported by shelf 31 and support bars 27. With optical component 13 fully seated within partition 29, it is to be understood that partition 29 serves to retain optical component 13 fixed in its proper position during the lamination process.

Tool 11 is then mounted onto a clean workstation platform 35 using complementary pairs of alignment posts 37, which are provided on platform 35, and circular countersunk bores 39 which are preformed into the four corners of frame 19. Using ionized air, any particulate present on optical component 13 is preferably blown off.

Figure 3B:
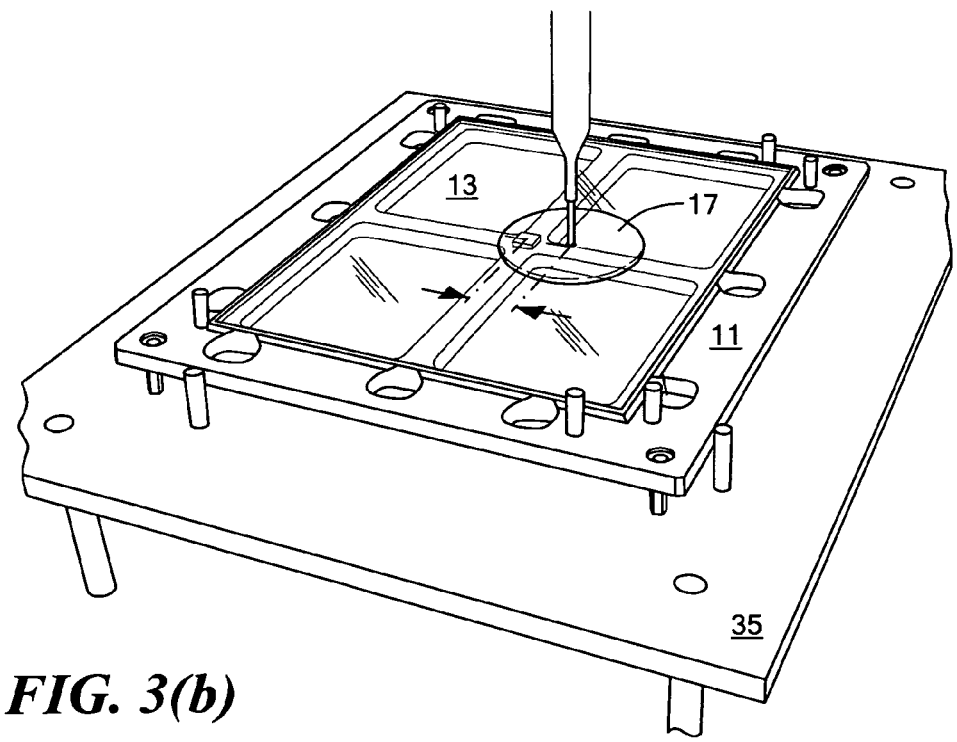
Figure 3C:
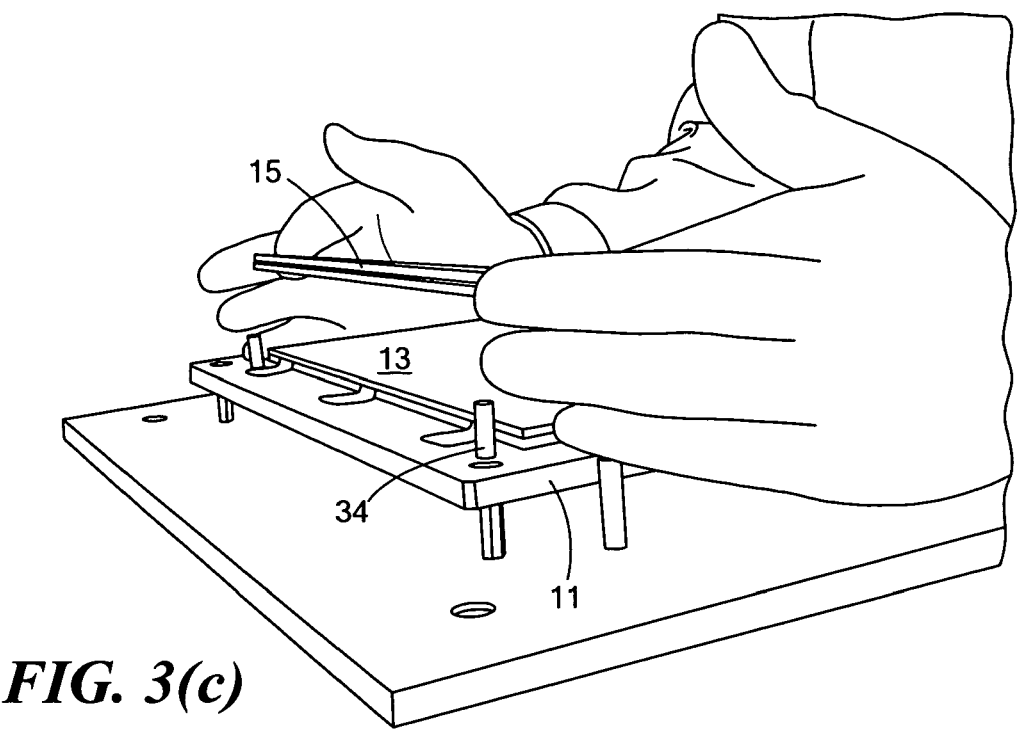
Figure 3D:
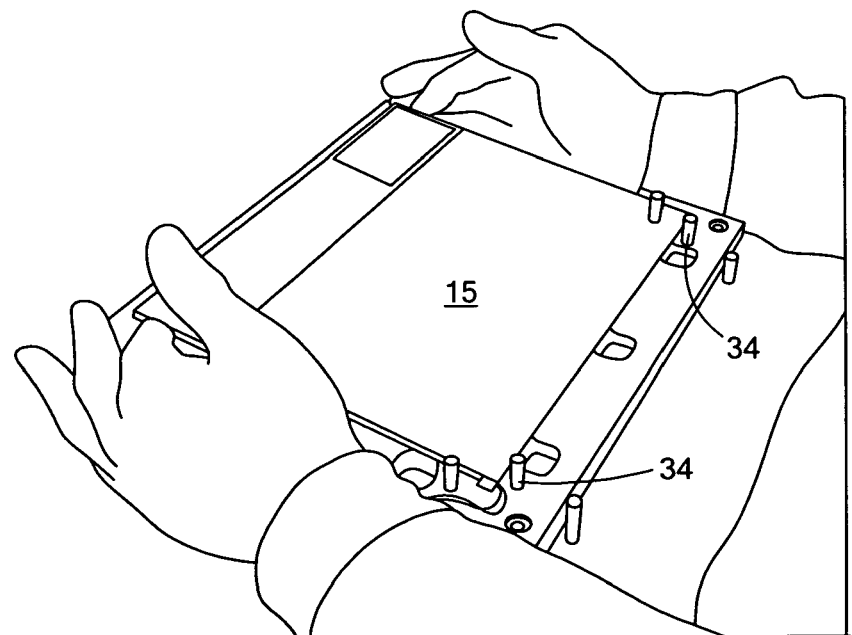
Figure 3E:
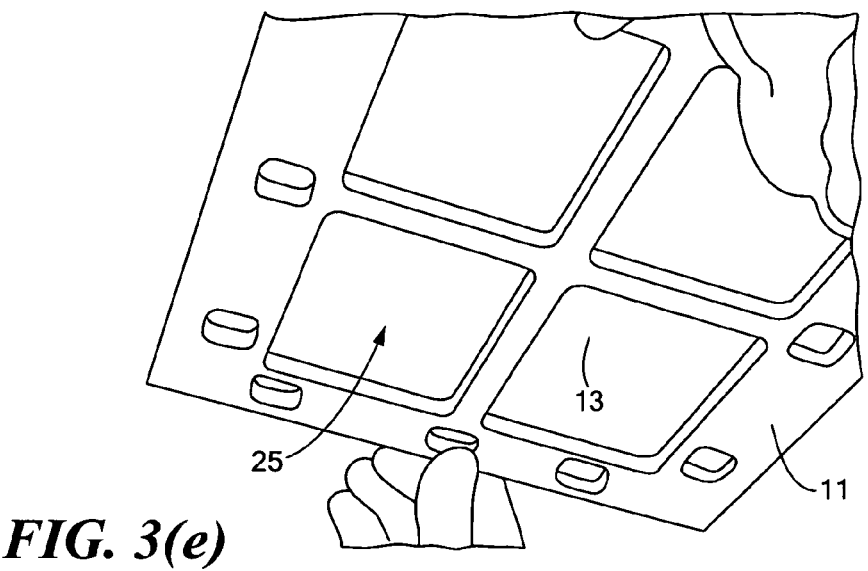
Figure 3F:
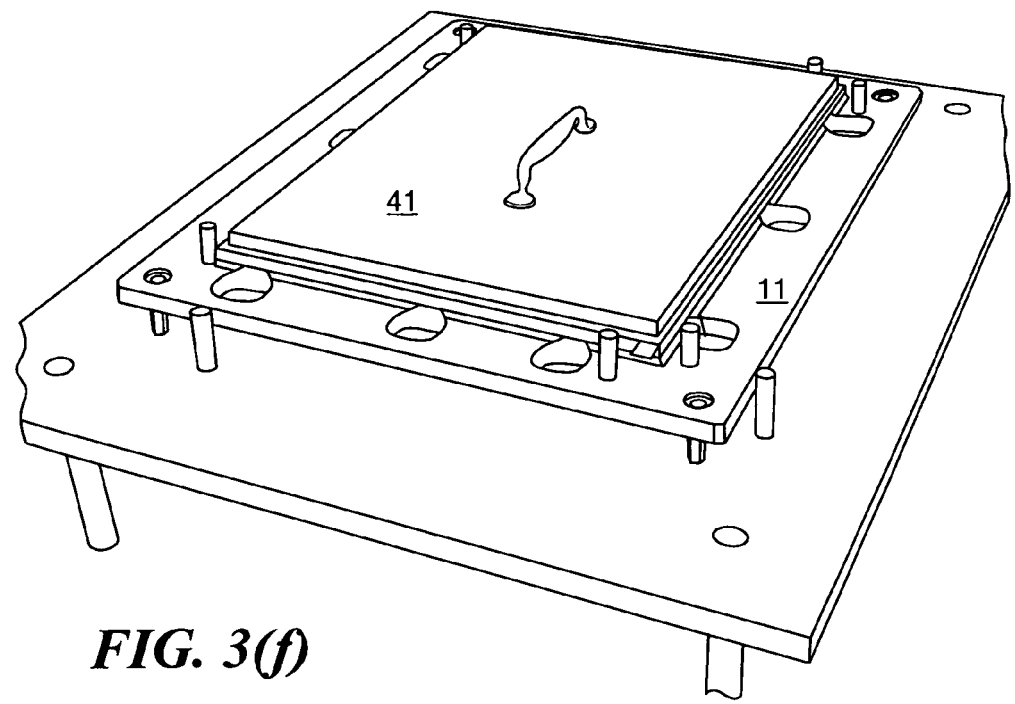
Figure 3G:
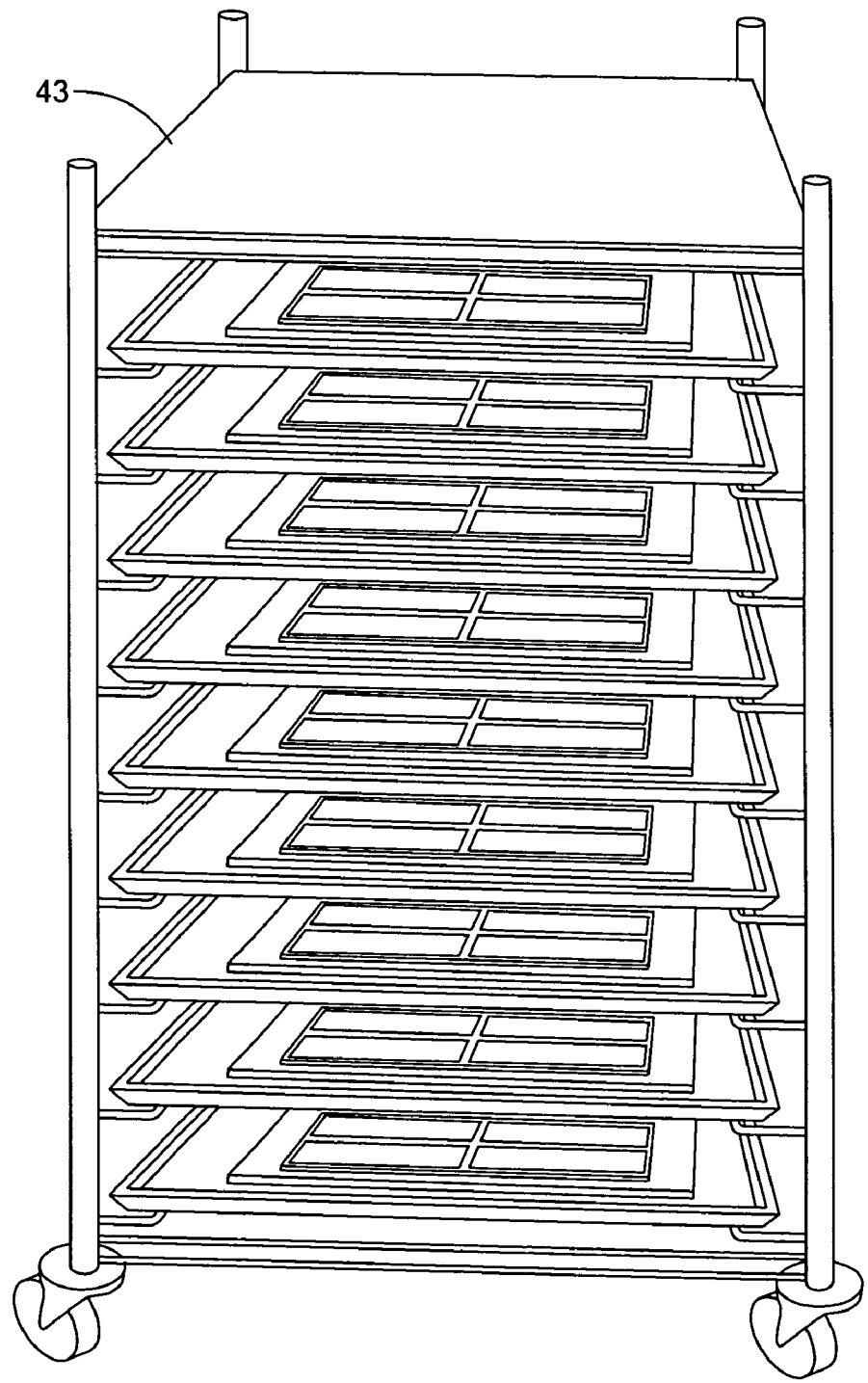

As shown in FIG. 3(b), a supply of silicone gel 17 is dispensed approximately 1.0 inch below the center point of optical component 13. Preferably, silicone gel 17 comprises a mixture of dimethyl siloxane and a vinyl terminated dimethyl polymer. The quantity of silicone gel 17 is then inspected for bubbles and/or debris, the inspection period lasting for approximately 2-3 seconds. If present in silicone gel 17, bubbles and/or debris are removed using a Nylon Point blade stick or other similar instrument.

A prefabricated liquid crystal display (LCD) 15 is then separated from any protective packaging and is inspected for cleanliness. It should be noted that the LCD used in conjunction with tool 11 preferably includes an outer metallic bezel, or frame, which serves to retain the liquid crystal display glass for the LCD against its printed circuit board.

As shown in FIGS. 3(*c*) and 3(*d*), the leading edge of LCD 15 is positioned against alignment posts 34 with wires from LCD 15 exiting off the lower left portion of tool 11. With the leading edge of LCD 15 positioned as such, the rear edge of LCD 15 is carefully lowered into position.

It should be noted that LCD 15 is supported entirely by the plurality of standoffs 33 on sidewall 29, thereby effectively maintaining the necessary uniform spacing apart from optical component 13. The weight of LCD 15 onto the puddle of silicone gel 17 causes gel 17 to spread evenly thereunder. Furthermore, posts 34 serve to retain LCD 15 fixed in place relative to optical component 13 as in its proper position as the bonding agent cures, as will be described further below.

As shown in FIG. 3(*e*), tool 11 is lifted upward in a level manner so that an inspection of the dispersion of silicone gel 17 can be achieved through window 25 (the inspection process lasting preferably for approximately 2-4 seconds). Examples of the types of defects which are to be identified and remedied during the inspection process include, but are not limited to, non-uniform dispersion of silicone gel 17, the presence of bubbles and/or debris in silicone gel 17, and improper positioning of LCD 15 on standoffs 33. If any of the above-identified defects are detected, LCD 15 is separated from optical component 13 before silicone gel 17 has an opportunity to cure (e.g., within approximately 20 minutes after dispensing). To the contrary, if none of the above-identified defects are detected, tool 11 is set onto a clean foil-lined tray.

As shown in FIG. 3(*f*), a bonding weight 41 is disposed on top of liquid crystal display 15 to more evenly disperse any excess silicone gel 17 before the adhesive curing process. Tool 11 and weight 41 are then loaded onto an ElectroStatic Discharge (ESD) cart 43, as shown in FIG. 3(*g*). At that time, silicone gel 17 is allowed to cure at ambient temperature (e.g., 21° C.-25° C.) for approximately 12-24 hours. Upon completion of the curing period, LCD stack-up 18 is removed from tool 11 and is baked at 60° C. for approximately 1½-2 hours.

Figure 4A:
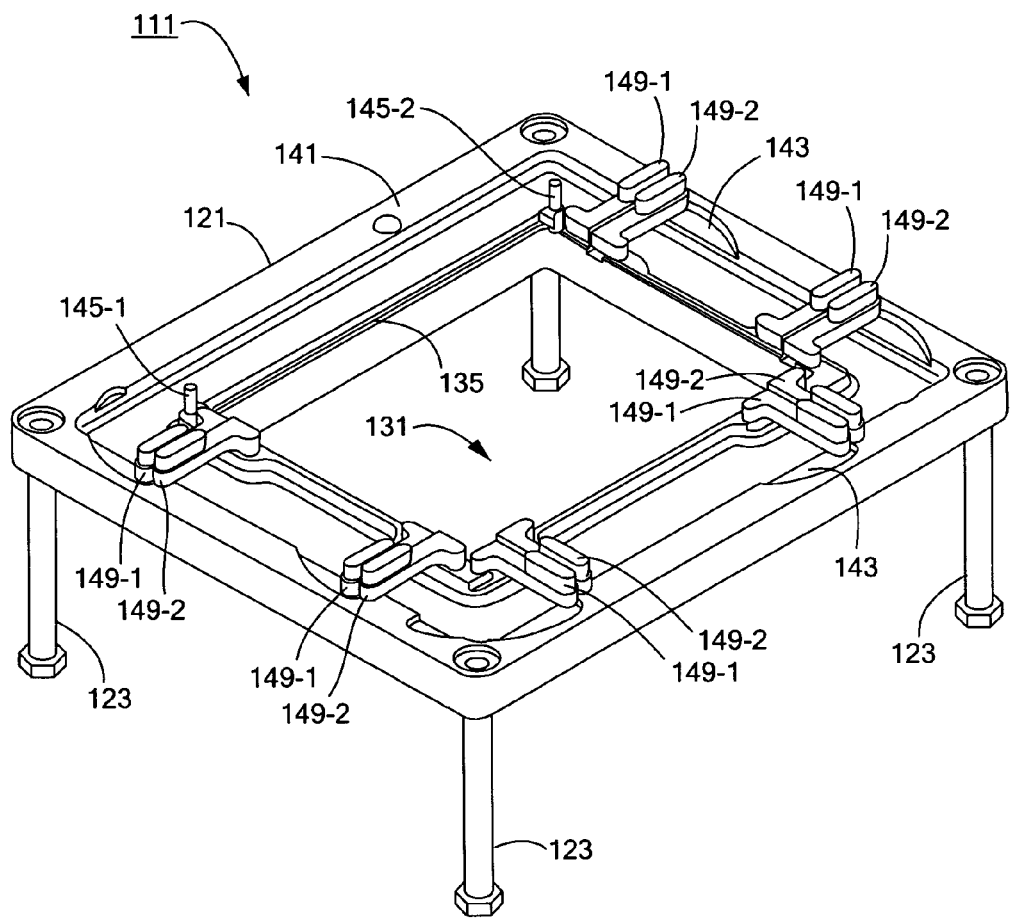
FIG. 4(a)-(b) are top perspective and exploded top perspective views, respectively of a second embodiment of a high volume glass lamination (HVGL) tool that is constructed according to the teachings of the present invention.
Figure 4B:
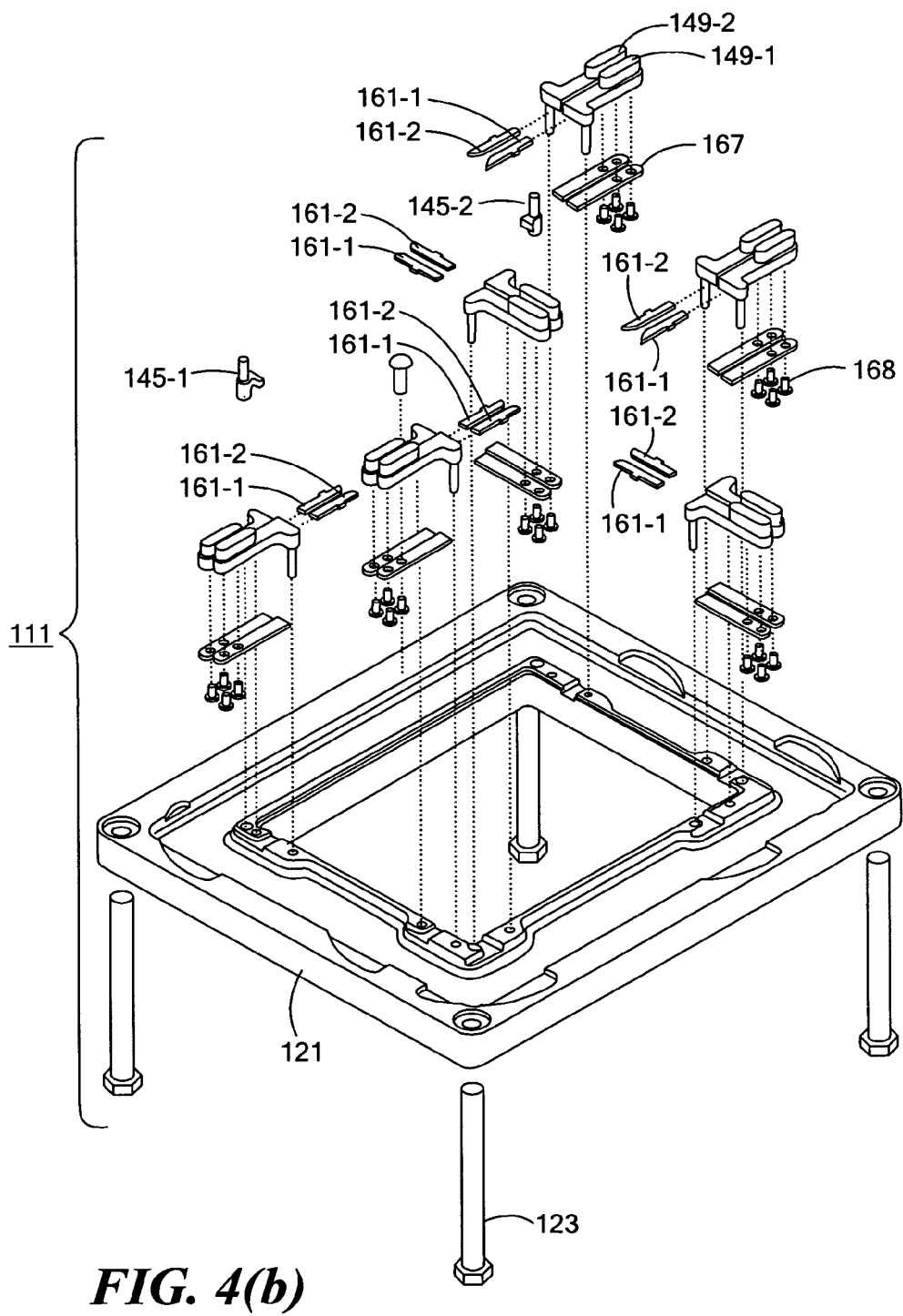

Referring now to FIG. 4(*a*)-(*b*), there are shown top perspective and exploded top perspective views, respectively, of a second embodiment of a high volume glass lamination (HVGL) tool that is constructed according to the teachings of the present invention, the tool being identified generally by reference numeral 111. As will be described in detail below, tool 111 (also referred to herein interchangeably as assembly fixture 111) is designed principally for the manufacture of an LCD stack-up 113 of the type shown in detail in FIG. 5(*a*)-(*c*). However, it is to be understood that tool 111 could be used in conjunction with alternate glass lamination processes without departing from the spirit of the present invention.

Figure 5A:
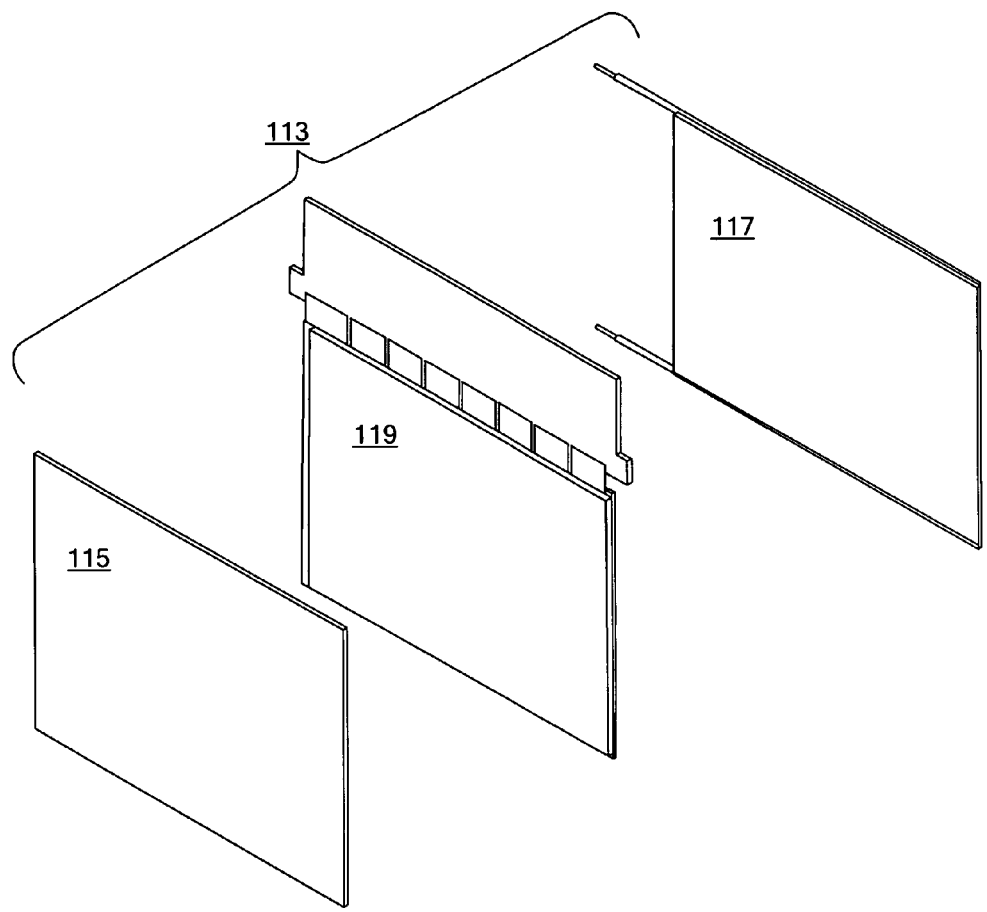
FIG. 5(a)-(c) are exploded perspective, front plan and right side plan views, respectively, of an LCD stack-up constructed using the tool shown in FIG. 4(a)
Figure 5C:
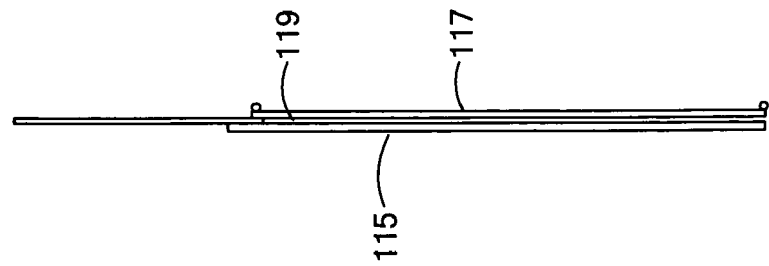
Figure 5B:
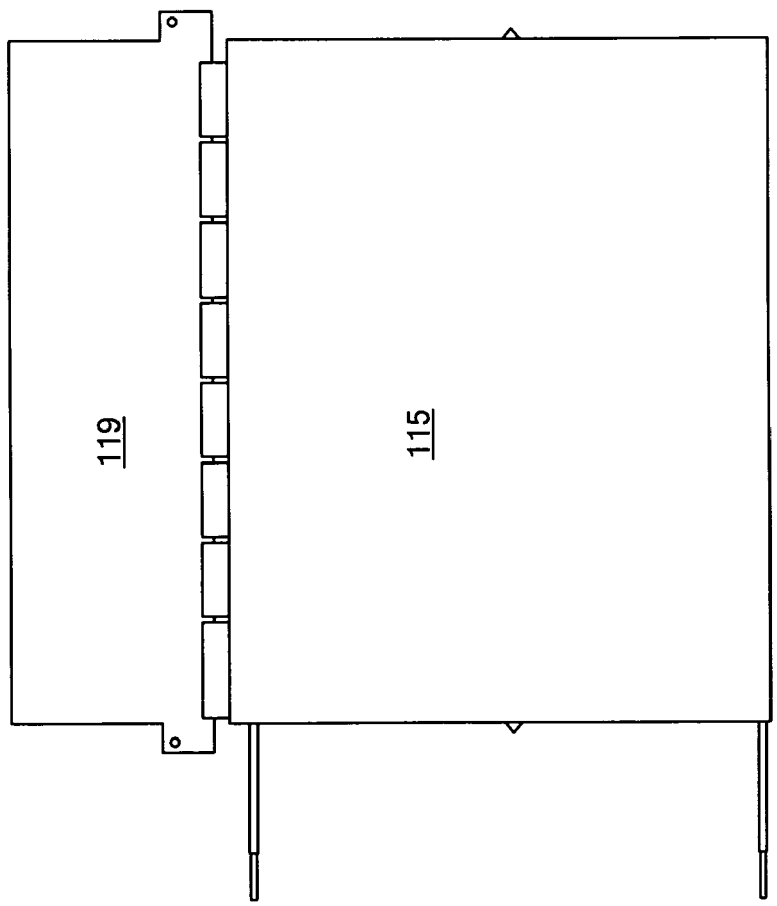

As seen most clearly in FIG. 5(*a*), LCD stack-up 113 comprises a front glass 115 and a rear heatable glass 117 that are affixed onto opposing surfaces of a bezel-free liquid crystal display (LCD) 119 using silicone gel, the lamination process for constructing LCD stack-up 113 to be described further in detail below.

Referring back to FIG. 4(*a*)-(*b*), tool 111 comprises a base plate, or frame, 121 (shown in isolation in FIG. 6) that is designed, among other things, to support various components of LCD stack-up 113 during its glass lamination processes. Base plate 121 is preferably constructed of a bare aluminum that is coated in electroless nickel, plate 121 having a length of approximately 11.14 inches, a width of approximately 9.61 inches and a thickness of approximately 0.75 inches.

A plurality of mounting posts 123 are press-fit into corresponding countersunk bores 125 formed in base plate 121 along its four outside corners. Together, posts 123 serve to mount base plate 121 onto a workstation platform (not shown) while providing adequate spacing therefrom.

Figure 6:
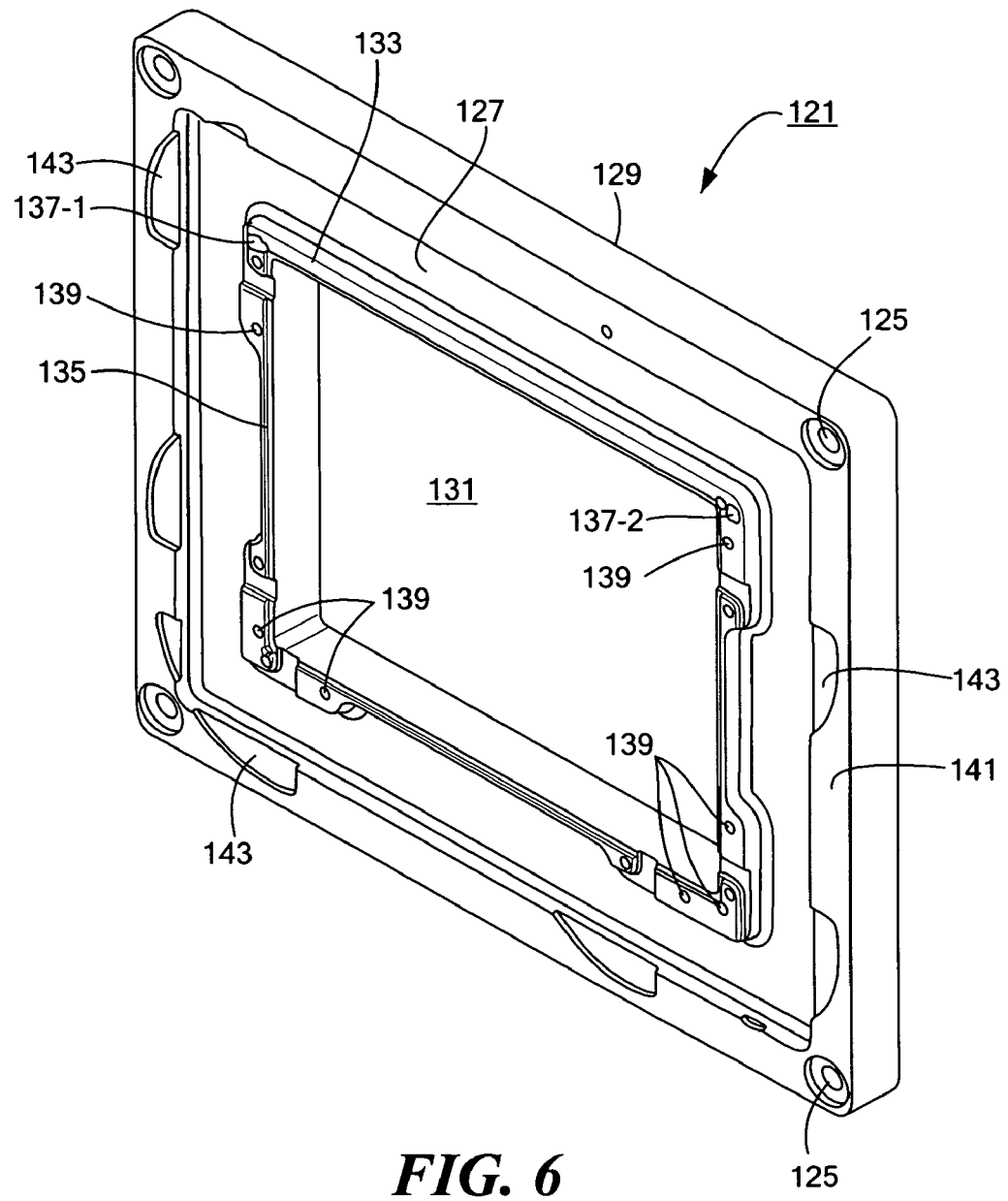
FIG. 6 is a top perspective view of the base plate shown in FIG. 4(b)

As seen most clearly in FIG. 6, base plate 121 includes a substantially flat top surface 127 and a substantially flat bottom surface 129. Base plate 121 is additionally shaped to define an enlarged, substantially rectangular window 131, the function of which is to become apparent below.

An inner, upwardly extending frame 133 is formed onto top surface 127 immediately surrounding window 131. It should be noted that inner frame 133 is spaced slightly outside of window 131 so as to define a thin, four-sided shelf 135 that is sized and shaped to receive front glass 115 during the manufacturing process for LCD stack-up 113. Inner frame 133 is also shaped to define both a pair of pin-receiving bores 137-1 and 137-2 and a plurality of pivot bores 139, the function of each to become apparent below.

An outer, upwardly extending frame 141 is similarly formed onto top surface 127 along its outer periphery. As can be seen, a plurality of arcuate shaped notches 143 are formed into outer frame 141 in a particular configuration, the function of notches 143 to be described in detail below.

Figure 7:
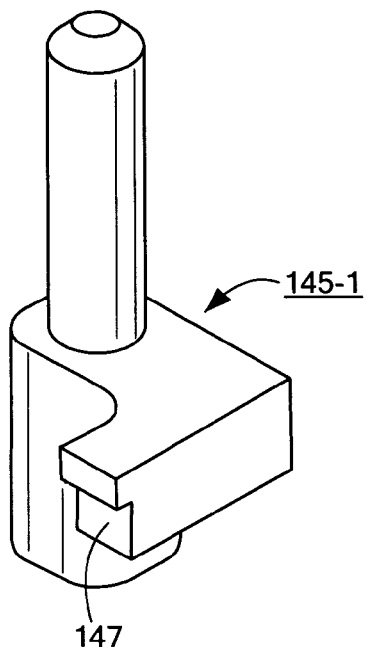
FIG. 7 is an enlarged top perspective view of the left corner pin shown in FIG. 4(b)
Figure 8:
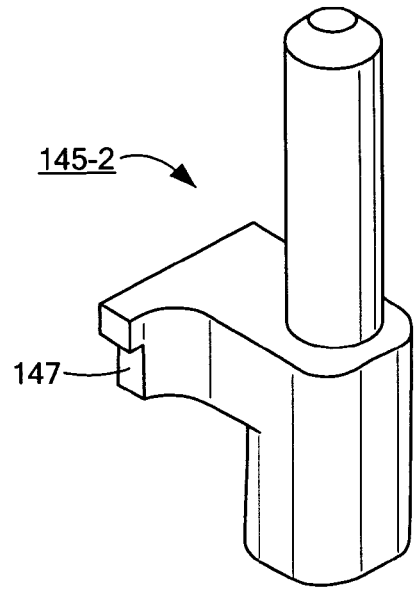
FIG. 8 is an enlarged top perspective view of the right corner pin shown in FIG. 4(b)

Referring back to FIGS. 4(*a*) and 4(*b*), tool 121 additionally includes a left corner pin 145-1 (shown in isolation in FIG. 7) and a right corner pin 145-2 (shown in isolation in FIG. 8) that are sized and shaped to rotatably mount into pin-receiving bores 137-1 and 137-2, respectively in base plate 121, pins 145-1 and 145-2 being constructed as mirror reflections of one another. Each pin 145 is preferably constructed of stainless steel and is provided with a stepped contact surface 147, the function of which to be described in detail below.

Assembly fixture 111 additionally includes a plurality of front glass pivots 149-1 and a plurality of rear glass pivots 149-2 that are sized and shaped to pivotally mount into corresponding pivot-receiving bores 139 in base plate 121, each pivot 149 being preferably constructed of stainless steel.

Figure 9:
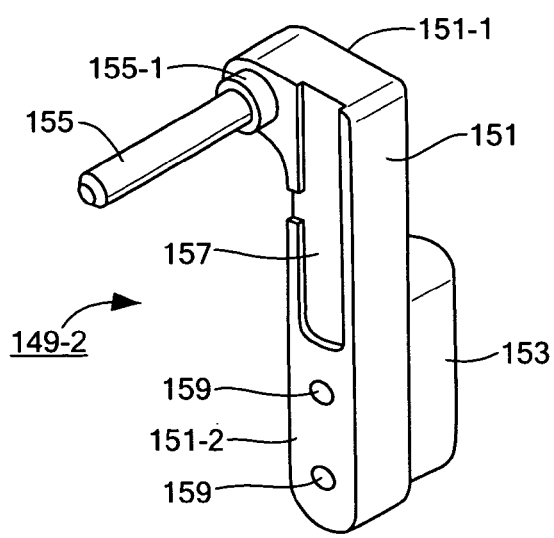
FIG. 9 is an enlarged bottom perspective view of one of the rear glass pivots shown in FIG. 4(b)

As seen most clearly in FIG. 9, each rear glass pivot 149-2 comprises an elongated lever 151 that includes a substantially flat top surface 151-1 and a substantially flat bottom surface 151-2. A handle 153 is formed onto top surface 151-1 in order to facilitate the manual rotation of pivot 149.

A cylindrical post 155 is formed onto bottom surface 151-2 and extends orthogonally away therefrom. Post 155 is sized and shaped to fit within a corresponding bore 139 in base plate 121 which in turn enables lever 151 to pivot. As can be seen, a short step 155-1 is provided at the junction between post 155 and bottom surface 151-2. As can be appreciated, step 155-1 serves to space lever 151 of pivot 149-2 slightly above top surface 127 of base plate 121.

A shallow recess 157 is formed into bottom surface 151-2 of lever 151 along its leading edge. In addition, a pair of threaded holes 159 are formed into bottom surface 151-2 along its trailing edge.

It should be noted that, although not shown in isolation herein, each front glass pivot 149-1 is identical in construction with rear glass pivot 149-2 with two notable exceptions. First, front glass pivot 149-1 is constructed as a mirror reflection of rear glass pivot 149-2 along each of their respective longitudinal axes. Second, front glass pivot 149-1 does not include step 155-1 which, in turn, causes each front glass pivot 149-1 to lie slightly beneath each rear glass pivot 149-2 when mounted on base plate 121, as seen most clearly in FIG. 4(*a*).

Tool 111 further comprises a plurality of shims 161-1, each of which is sized and shaped to fit within recess 157 of a corresponding front glass pivot 149-1. Similarly, tool 111 includes a plurality of shims 161-2, each of which is sized and shaped to fit within recess 157 of a corresponding rear glass pivot 149-2, wherein each shim 161-1 is a mirror reflection of shim 161-2.

Figure 10:
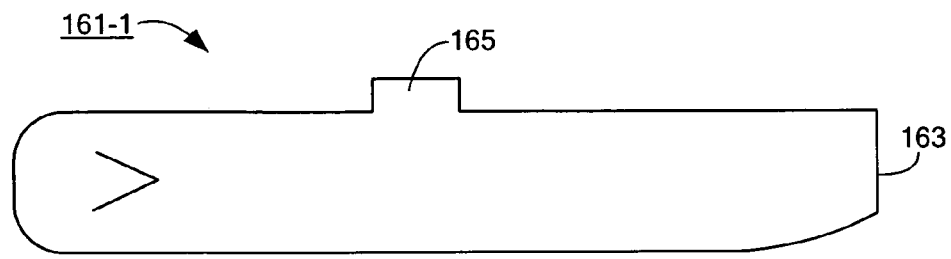
FIG. 10 is an enlarged top plan view of one of the shims shown in FIG. 4(b)
Figure 11A:
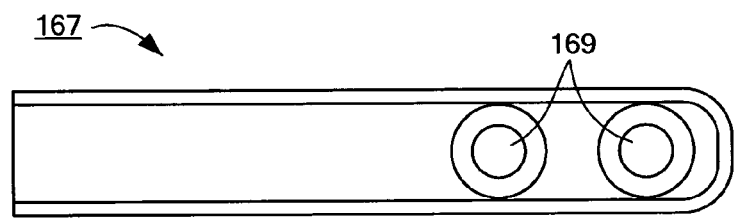
FIG. 11(a)-(b) are top plan and right end plan views, respectively, of one of the pivot clamps shown in FIG. 4(b)
Figure 11B:
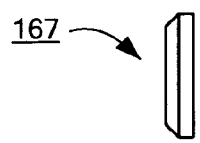
Figure 12A:
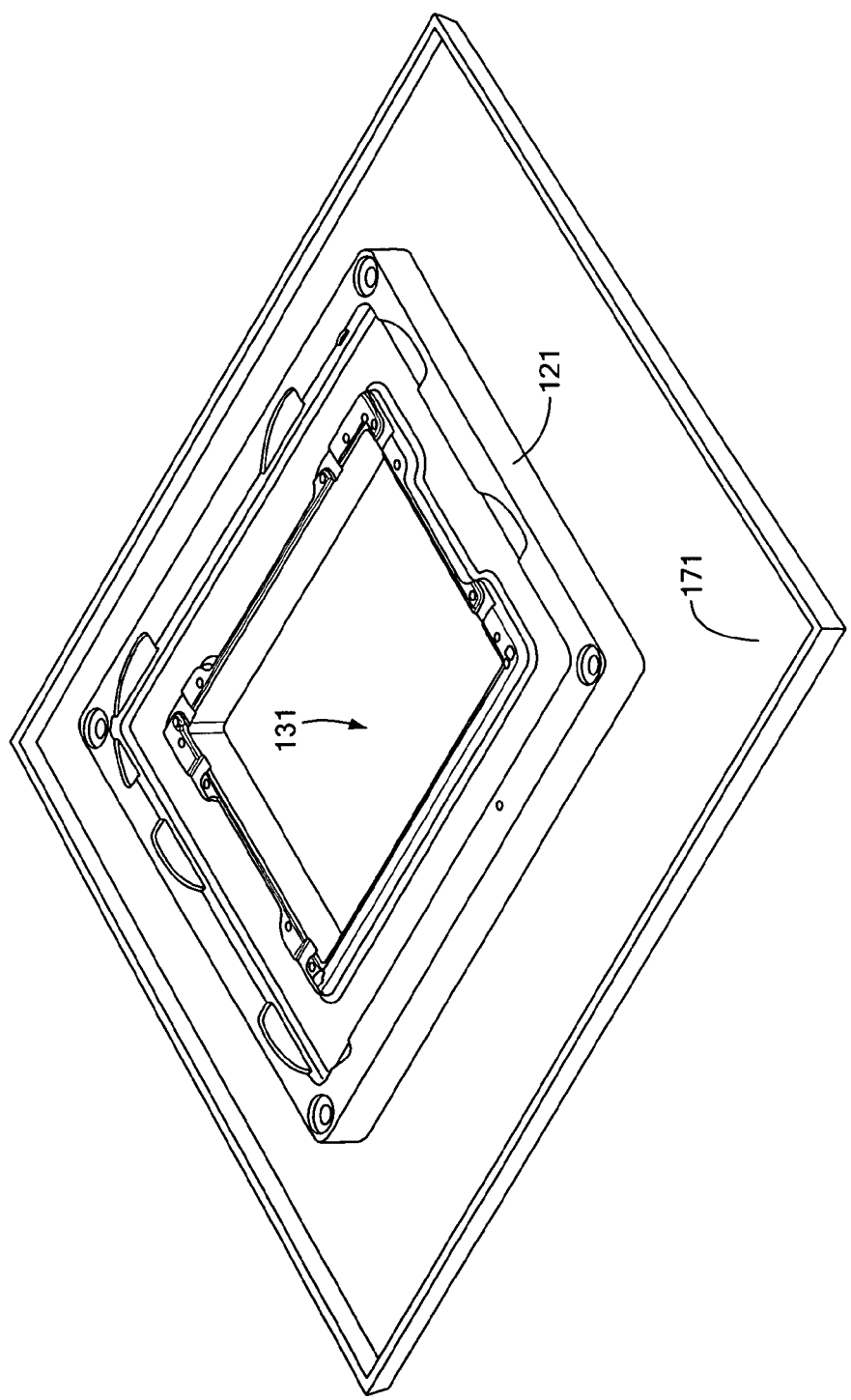
FIG. 12(a)-(i) are selected views which are useful in understanding the method of constructing a liquid crystal display stack-up using the tool shown in FIG. 4(a)
Figure 12B:
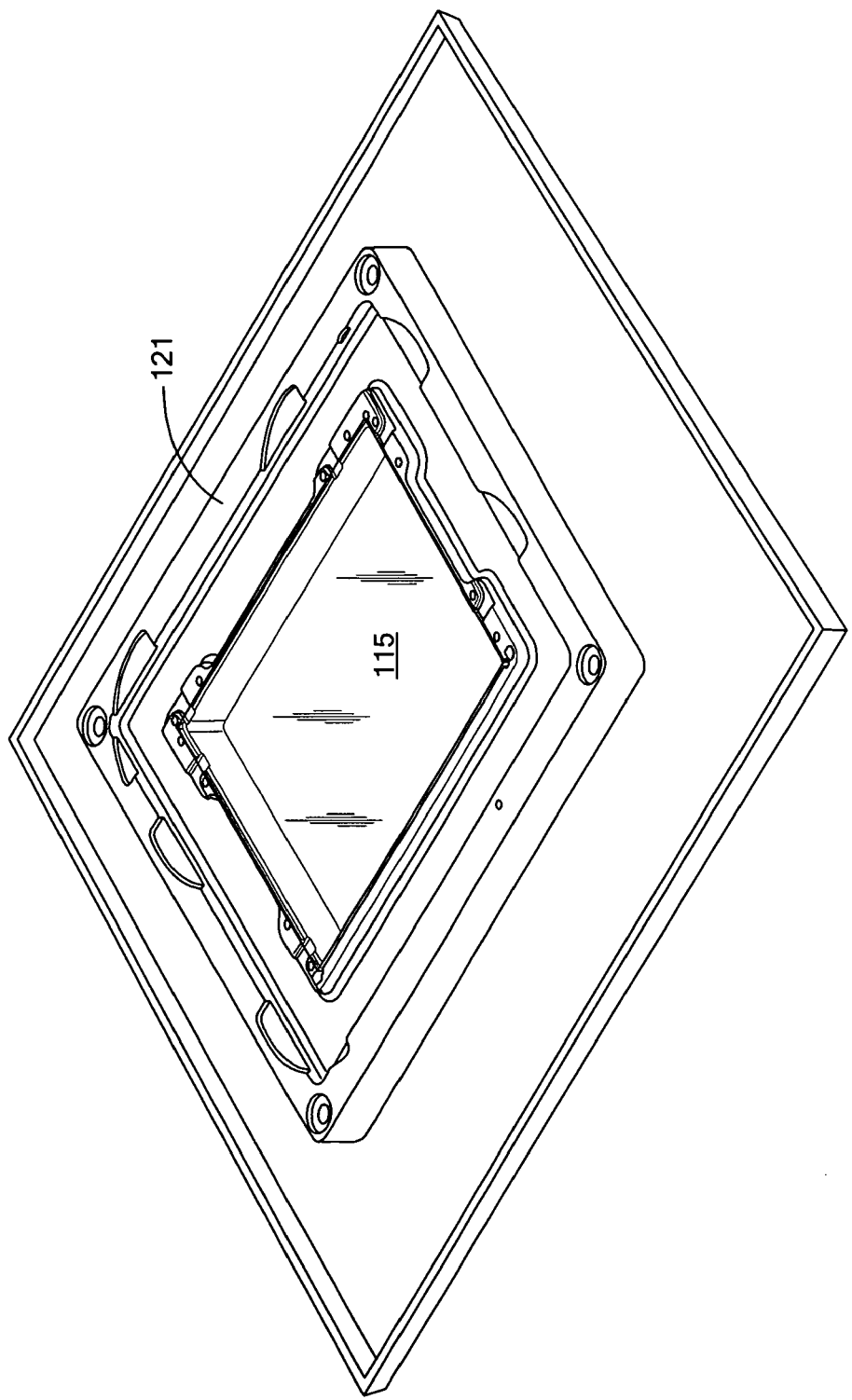
Figure 12C:
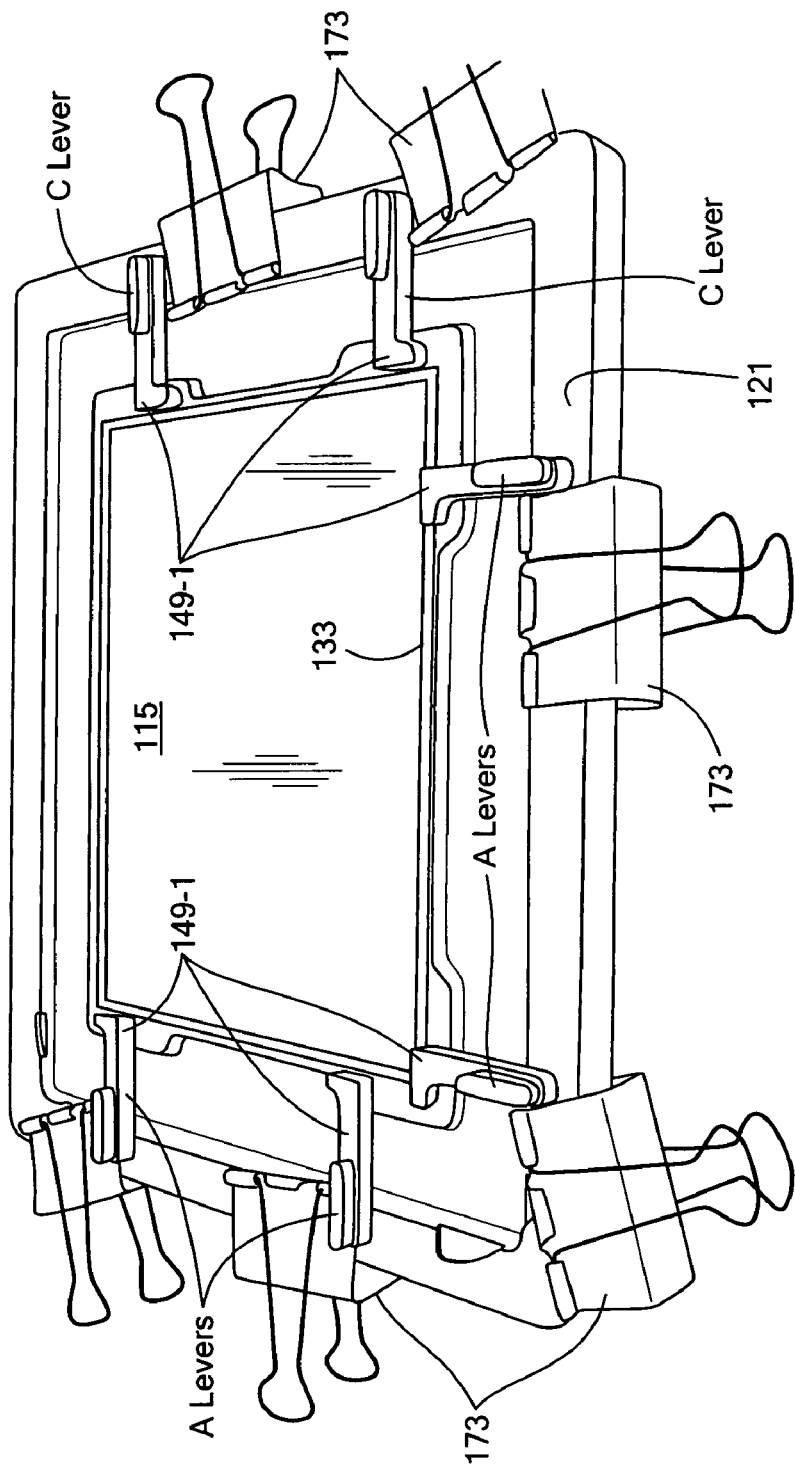
Figure 12D:
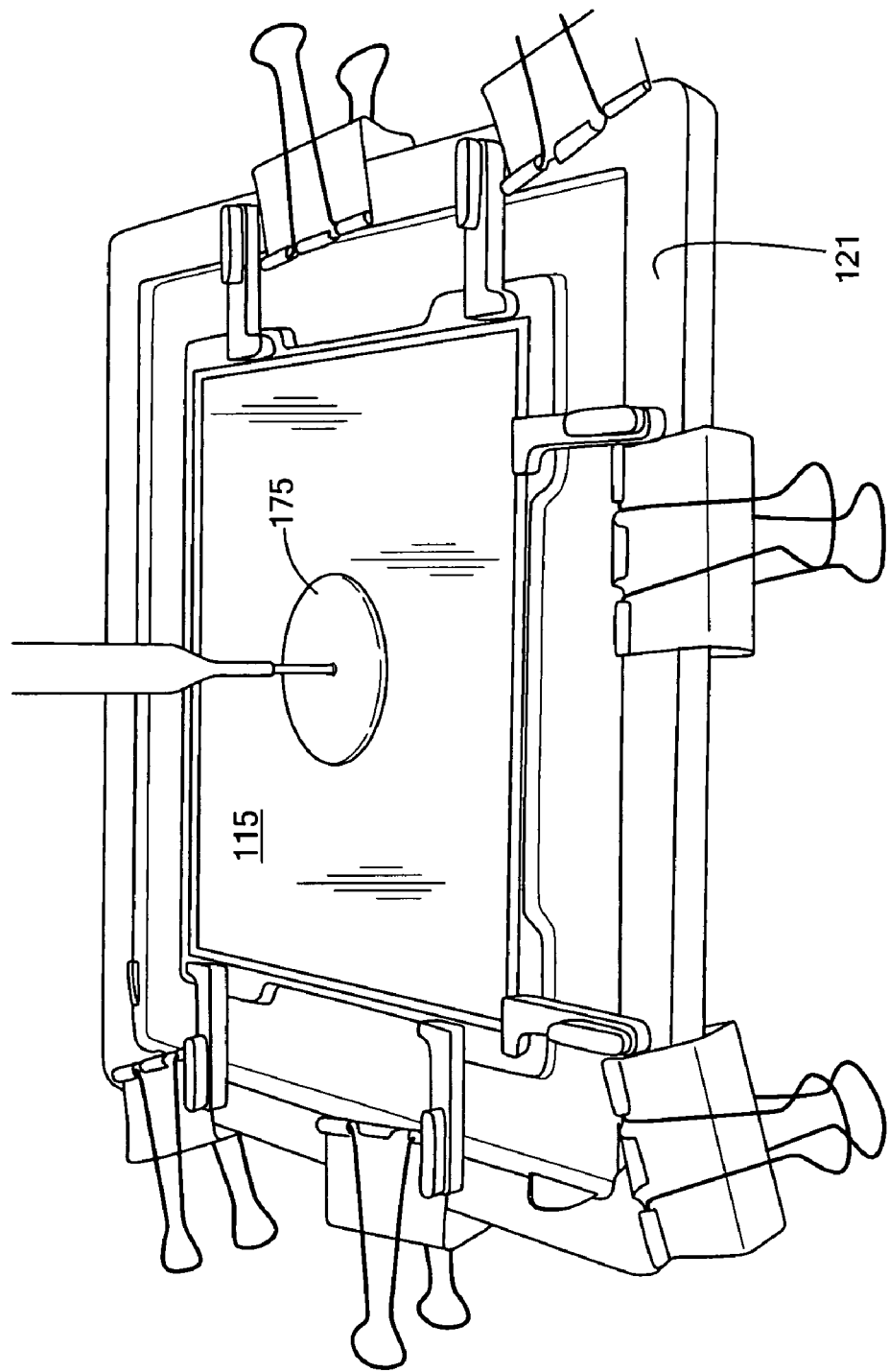
Figure 12E:
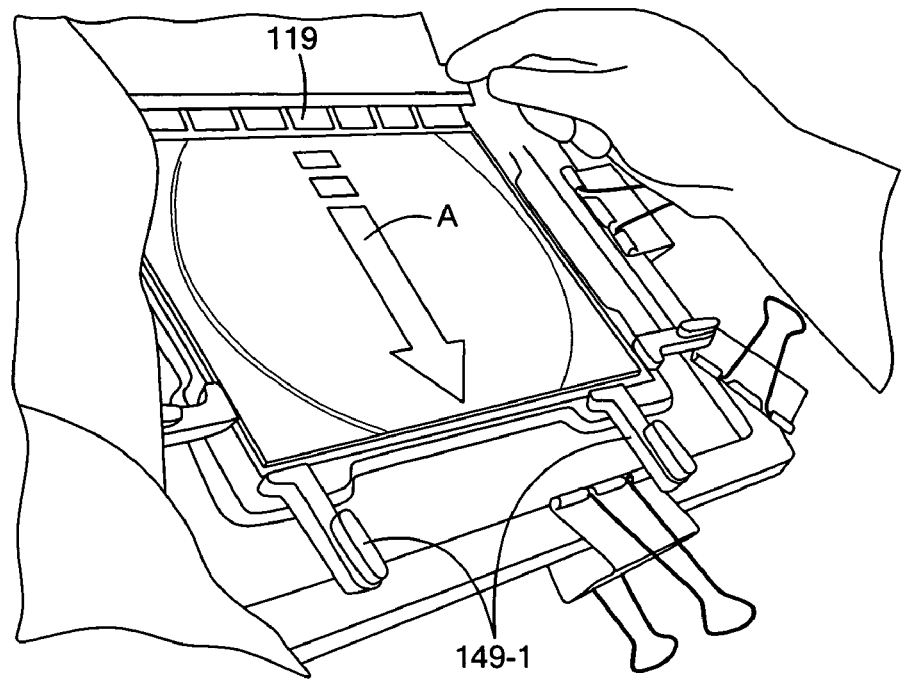
Figure 12F:
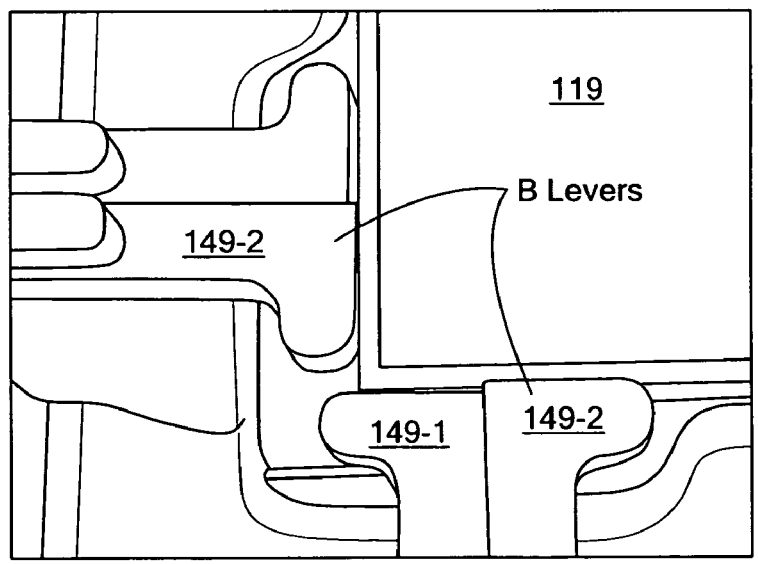
Figure 12G:
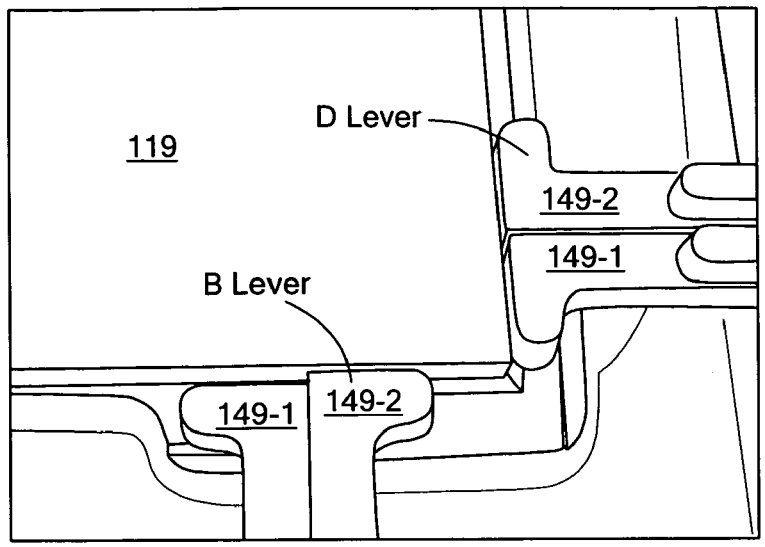
Figure 12H:
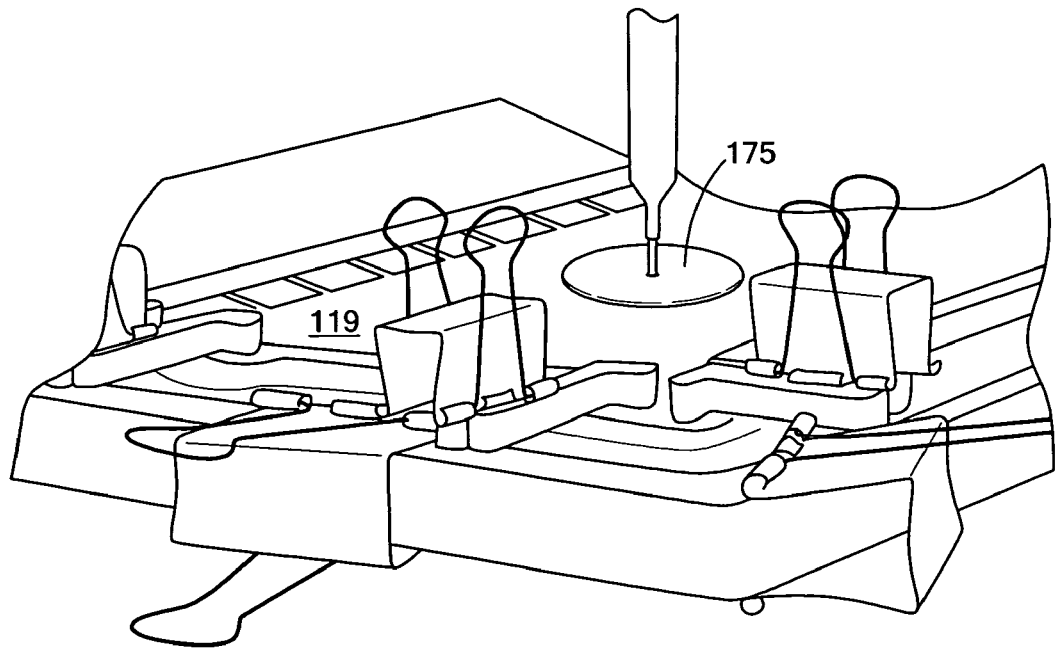
Figure 12I:
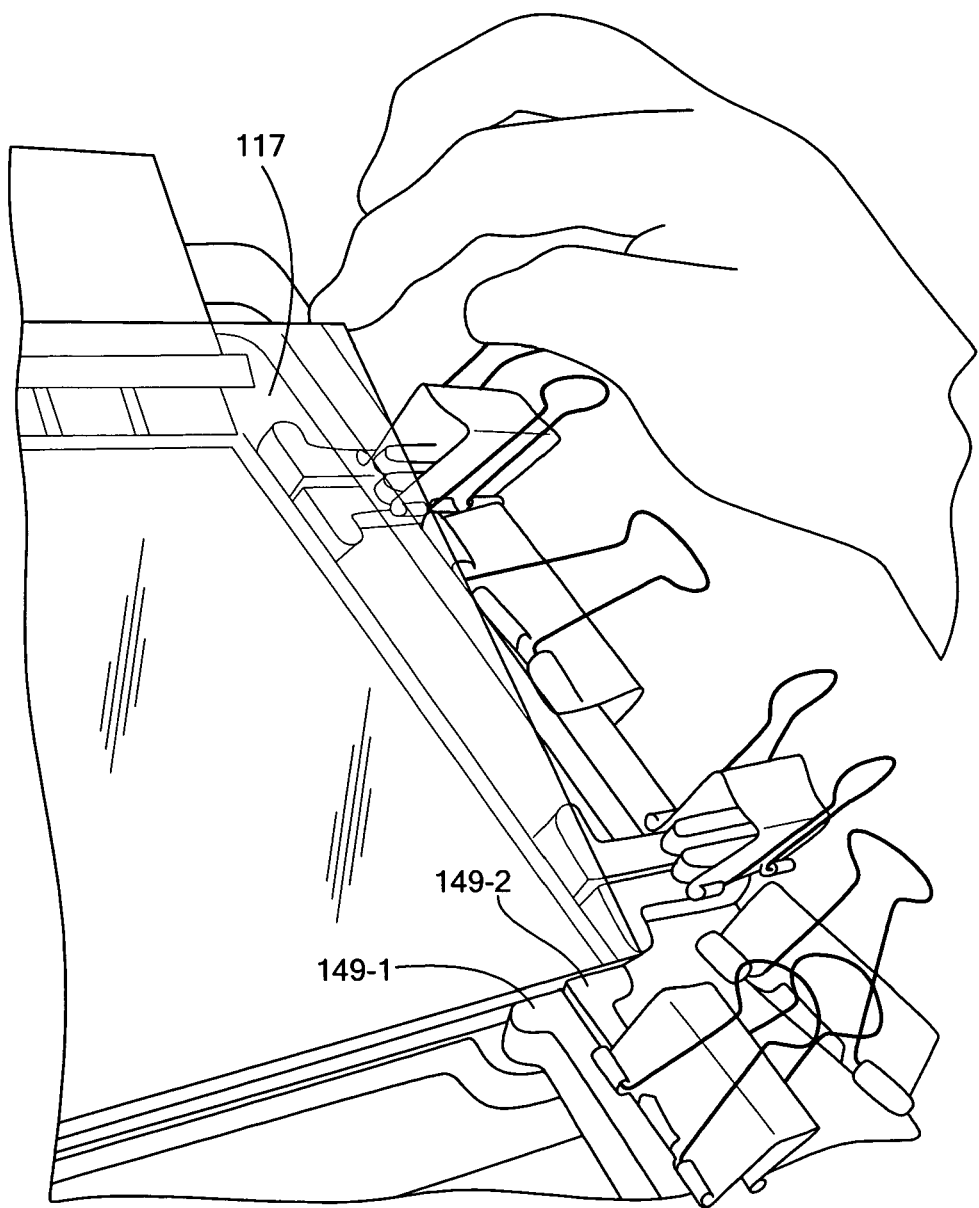
Figure 12J:
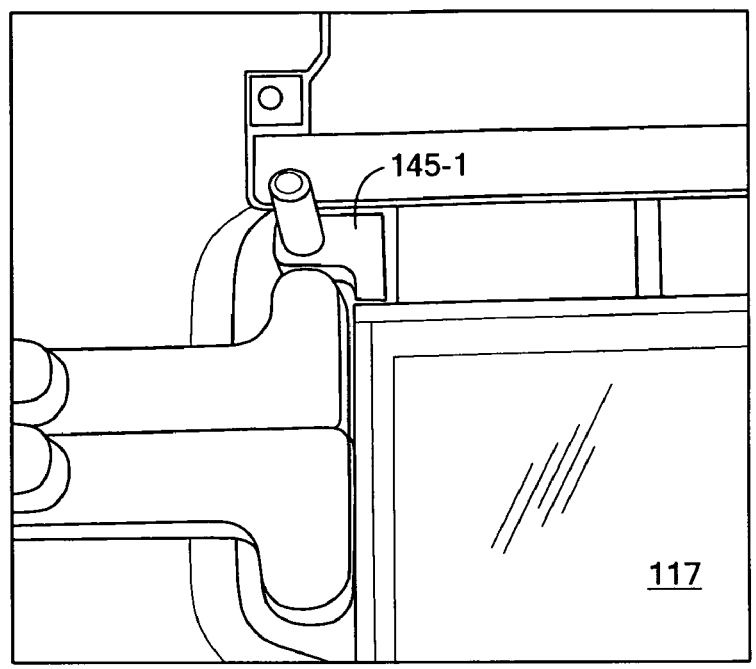
Figure 12K:
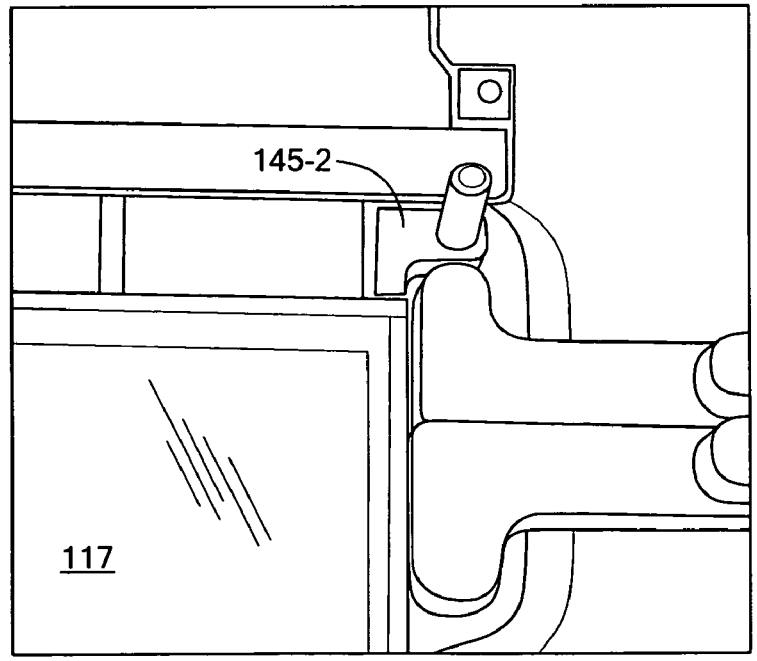
Figure 12L:
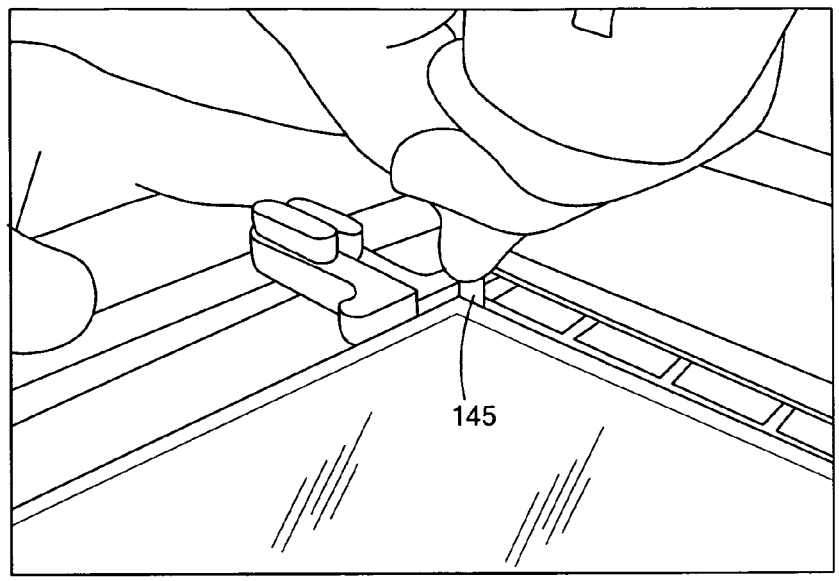
Figure 12M:
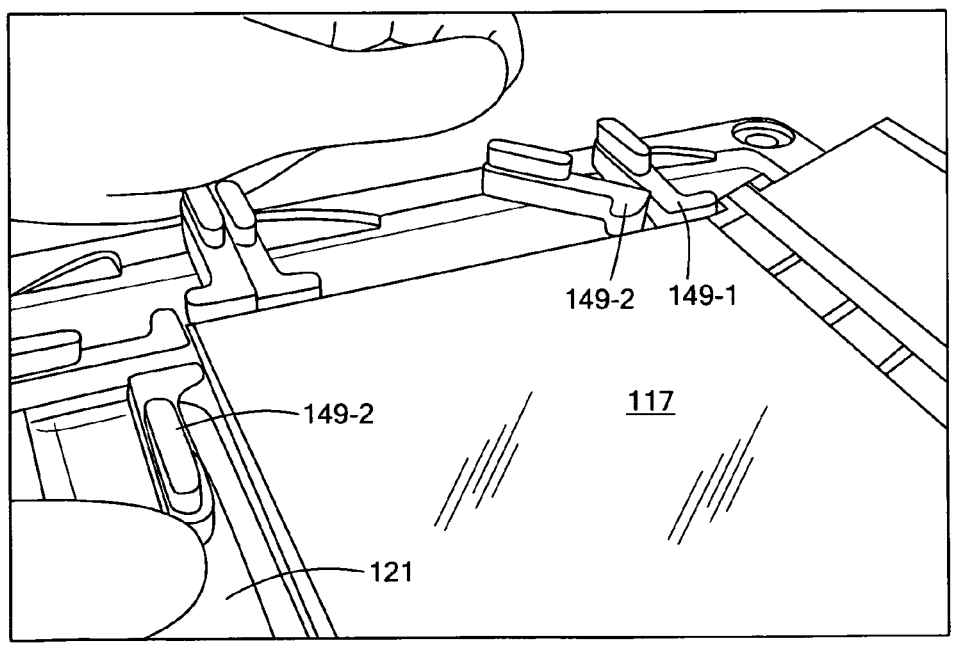
Figure 12N:
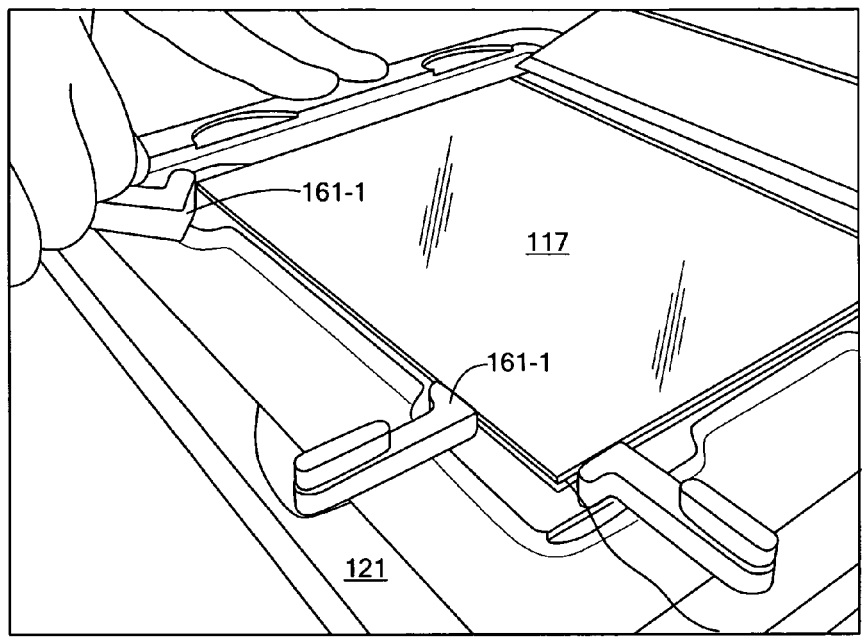

As seen most clearly in FIG. 10, each shim 161-1, which is preferably constructed of an 0.020 inch thick Teflon™, has an elongated, flattened, blade-shaped design with a flat leading edge 163 and a retention tab 165. As can be appreciated, each shim 161 is sized and shaped to fit securely within recess 157 of pivot 149 with the leading edge 163 of shim 161 extending slightly beyond the leading edge of pivot 149. With shim 161 disposed as such, a stainless steel pivot clamp 167 is mounted onto bottom surface 151-2 of pivot 149 to effectively trap shim 161 in place within recess 157. A plurality of threaded screws 168 are disposed through openings 169 in pivot clamp 167 and into threaded engagement with holes 159 in pivot 149, thereby permanently retaining pivot clamp 167 against pivot 149.

In use, tool 111 may be used in the following manner to assist in the manufacture of LCD stack-up 113. Specifically, as seen most clearly in FIG. 12(*a*), base plate 121 is first positioned on a flat, tin foil lined baker's tray 171. With base plate 121 positioned as such, front glass 115 is fully seated, coated side down, along the narrow shelf 135 that immediately surrounds window 131, as shown in FIG. 12(*b*).

Referring now to FIG. 12(*c*), with front glass 115 seated on shelf 135, a plurality of front glass pivots 149-1 are pivotally mounted into corresponding bores 139 in inner frame 133, each pivot 149-1 having a corresponding shim 161-1 fixedly secured to its underside by a pivot clamp 167. Mounted as such, it is to be understood that each shim 161-1 lies directly on top of the rear surface of front glass 115.

It should be noted that clips 173 may be mounted on outer frame 141 to prevent each pivot 149-1 from inadvertently rotating. For purposes of identification only, it should also be noted that a pair of pivots 149-1 are identified in FIG. 12(*c*) as "C Levers", with the remaining pivots 149-1 being identified in FIG. 12(*c*) as "A Levers".

Referring now to FIG. 12(*d*), a supply of silicone gel 175 is dispensed onto the rear surface of front glass 115. Preferably, silicone gel 175 comprises a mixture of dimethyl siloxane and a vinyl terminated dimethyl polymer. The quantity of silicone gel 175 is then inspected for bubbles and/or debris. If present in silicone gel 175, bubbles and/or debris are removed using a wooden stick or other similar instrument.

The leading edge of bezel-free LCD 119 is then disposed in contact against a pair of front glass pivots 149-1, as represented by arrow A in FIG. 12(*e*). With the leading edge of LCD 119 disposed in proper alignment, the rear edge of LCD 119 is carefully lowered into position, the weight of LCD 119 being supported entirely by shims 161-1. Having disposed LCD 119 in this manner, it is to be understood that the center of LCD 119 causes the puddle of silicone gel 175 to spread evenly between front glass 115 and LCD 119.

Referring now to FIGS. 12(*f*) and 12(*g*), with LCD 119 mounted on front glass 115, a plurality of rear glass pivots 149-2 are pivotally mounted into corresponding bores 139 in inner frame 133, each pivot 149-2 having a corresponding shim 161-2 fixedly secured to its underside by a pivot clamp 167. It should be noted that, because each pivot 149-2 includes step 155-1 on its post 155, each pivot 149-2 lies slightly above its corresponding front glass pivot 149-1. In this manner, it is to be understood that each pivot 149-2 rests directly upon outer frame 141 with its associated shim 161-2 lying directly on top of the rear surface of LCD 119.

It should be noted that clips 173 may be mounted on outer frame 141 to prevent each pivot 149-2 from inadvertently rotating. For purposes of identification only, it should also be noted that a selected pivot 149-2 is identified in FIG. 12(*g*) as a "D Lever" and the remaining pivots 149-2 in FIGS. 12(*f*) and 12(*g*) are identified as "B Levers".

Referring now to FIG. 12(*h*), another supply of silicone gel 175 is dispensed onto the rear surface of LCD 119. The quantity of silicone gel 175 is then inspected for bubbles and/or debris. If present in silicone gel 175, bubbles and/or debris are removed using a wooden stick or other similar instrument.

The leading edge of rear glass 117 is then disposed in contact against selected pivots 149, as shown in FIG. 12(*i*). With the leading edge of rear glass 117 disposed in proper alignment, the trailing edge of rear glass 117 is carefully lowered into position, the weight of rear glass 117 being supported entirely by shims 161-2. Having disposed rear glass 117 in this manner, it is to be understood that the center of rear glass 117 causes the puddle of silicone gel 175 to spread evenly between rear glass 117 and LCD 119.

With rear glass 117 now mounted on LCD 119, left corner pin 145-1 is mounted into pin-receiving bore 137-1, with its stepped contact surface 147 abutting against the trailing edge of LCD stack-up 113 to hold it fixed in place, as shown in FIG. 12(*j*). Similarly, right corner pin 145-2 is mounted into pin-receiving bore 137-2, with its stepped contact surface 147 abutting against the trailing edge of LCD stack-up 113 to hold it fixed in place, as shown in FIG. 12(*k*).

The completed LCD stack-up 113, while still mounted in assembly fixture 111, is loaded into an ESD cart. At that time, the two layers of silicone gel 175 are allowed to cure at ambient temperature (e.g., 21° C.-25° C.) for at least 4 hours. At the end of the ambient curing period, left and right corner pins 145 (as well as any clips 173) are removed from base plate 121, as shown in FIG. 12(*l*).

Next, rear glass pivots 149-2 are carefully rotated such that their corresponding shims 161-2 withdraw from the second layer of adhesive, as shown in FIG. 12(*m*). It should be noted that the elongated lever 151 for each pivot 149 aligns within a corresponding arcuate notch 143 in outer frame 141 to enable its rotation. Having been rotated in the manner set forth above, rear glass pivots 149-2 are then removed from base plate 121.

Finally, front glass pivots 149-1 are carefully rotated such that their corresponding shims 161-1 withdraw from the first layer of adhesive, as shown in FIG. 12(*n*). Having been rotated in the manner set forth above, front glass pivots 149-1 are then removed from base plate 121.

At this time, LCD stack-up 113 can be removed from tool 111 by gently applying pressure to front glass 115 to the extent necessary break any excess adhesive that may inadvertently bond stack-up 113 to tool 111. Having been separated from fixture assembly 111, LCD stack-up 113 is post-baked in an oven at 60° C. for approximately 1½-2 hours to complete the curing process for silicone gel 175.

Figure 13A:
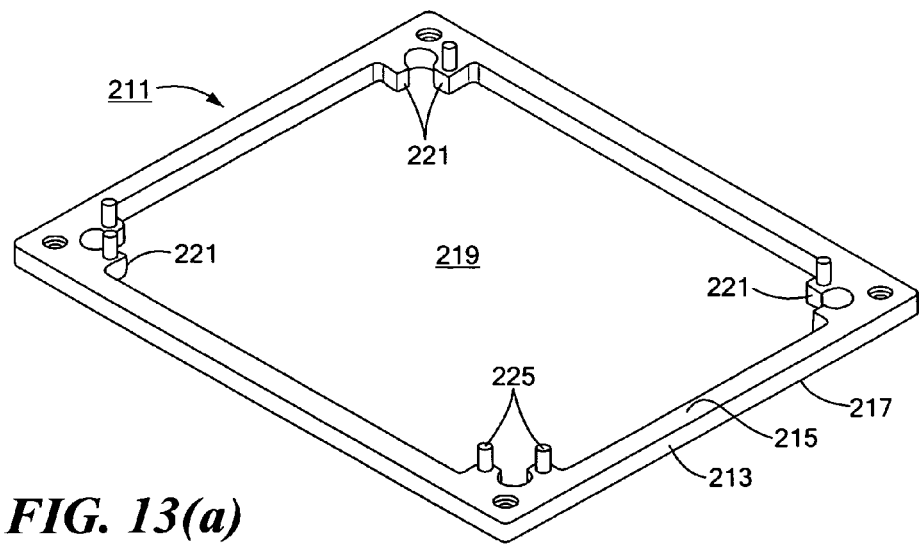
FIG. 13(a)-(c) are top perspective, top plan, an enlarged, fragmentary, top plan views, respectively, of a third second embodiment of a high volume glass lamination (HVGL) tool that is constructed according to the teachings of the present invention.

Referring now to FIGS. 13(*a*)-13(*c*), there are shown top perspective, top plan and enlarged, fragmentary top plan views, respectively, of a third embodiment of a high volume glass lamination (HVGL) tool that is constructed according to the teachings of the present invention, the tool being identified generally by reference numeral 211. As will be described in detail below, HVGL tool 211 is designed principally for use in affixing an optical component to a liquid crystal display using an adhesive. However, it is to be understood that tool 211 could be used in conjunction with alternate glass lamination processes without departing from the spirit of the present invention.

Tool 211 is similar in design to tool 11 in that tool 211 comprises a rigid and durable frame, or platen, 213 that is preferably constructed out of metal, such as a nickel-plated aluminum, frame 213 being approximately 11.0 inches in length, 10.0 inches in width and 0.4 inches in thickness. Frame 213 includes a substantially flat top surface 215 and a substantially flat bottom surface 217 and is shaped to define an enlarged, substantially rectangular, central window 219.

Figure 13B:
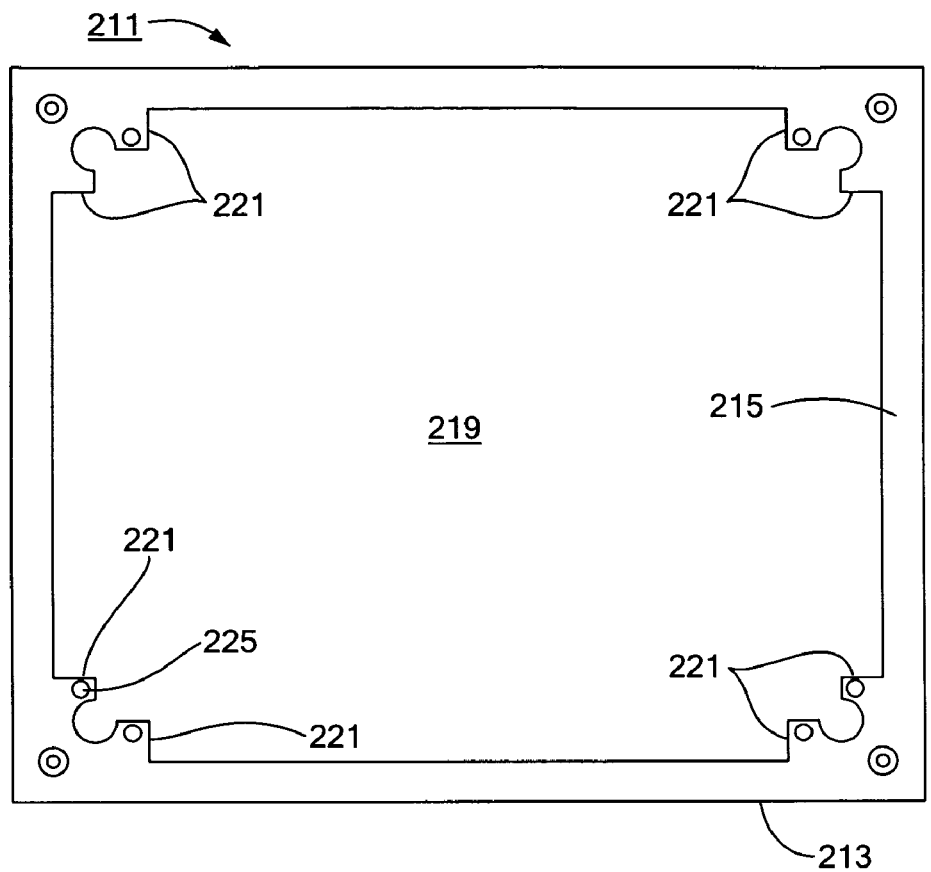
Figure 13C:
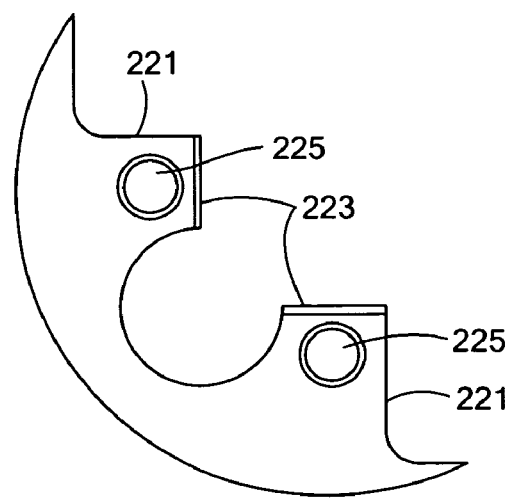

Referring now to FIG. 13(b), a pair of narrow glass-supporting tabs 221 are integrally formed onto the inner surface of frame 213 at each corner and extend partially into window 219. As seen most clearly in FIG. 13(c), the free end of each tab 211 is provided with a step 213 which is sized and shaped to support an optical component (e.g., glass) during the process of affixing an liquid crystal display thereto.

A plurality of generally cylindrical posts, or dowel pins, 225 are press fit into corresponding holes that are preformed into selected tabs 221 of frame 213, each post 225 being fixedly mounted in frame 213 in such a manner so as to extend orthogonally away from top surface 215. Each post 225 is preferably constructed out of stainless steel and has a diameter of approximately 0.25 inches and a length of approximately 0.875 inches. As can be appreciated, posts 225 function as alignment pins, or guides, which are useful in maintaining the proper position of selected components during the process of glass lamination.

It should be noted that the particular design of tool 211 introduces a couple notable advantages over glass lamination tools which are well-known in the art.

As a first advantage, glass that is to be laminated using tool 211 is supported entirely by step 223 on tabs 221. Due to the particular design of support tabs 221, the degree of contact established between the glass and tool 211 is minimized. As a result of minimizing the contact established between the glass and tool 211, a limited extent of the surface area of tool 211 is exposed to bonding material which, in turn, greatly simplifies the process for cleaning tool 211 for future use, which is highly desirable.

As a second advantage, tool 211 has a relatively simple design. As a consequence, it is to be understood that tool 211 is inexpensive to manufacture in comparison with conventional glass lamination tools, which is highly desirable.

The embodiments shown in the present invention are intended to be merely exemplary and those skilled in the art shall be able to make numerous variations and modifications to them without departing from the spirit of the present invention. All such variations and modifications are intended to be within the scope of the present invention as defined in the appended claims.

What is claimed is:

1. A tool for use in affixing an optical component to a liquid crystal display using a silicone gel, the tool comprising:
   (a) a frame shaped to define a central window, the frame comprising,
      (i) a top surface,
      (ii) a bottom surface,
      (iii) a upwardly extending partition formed on the top surface around the outer periphery of the central window, the partition being spaced slightly away from the outer periphery of the central window so as to define a narrow shelf which is adapted to support the optical component, and
      (iv) a plurality of upwardly extending standoffs formed onto the free end of the partition, the plurality of standoffs extending up from the partition the same distance, the plurality of standoffs being adapted to support the liquid crystal display, and
   (b) plurality of alignment posts coupled to the frame.

2. The tool as claimed in claim 1 wherein the plurality of upwardly extending standoffs serve to space the liquid crystal display a uniform distance apart from the optical component.

3. The tool as claimed in claim 2 wherein the frame is a unitary device that is constructed of metal.

4. The tool as claimed in claim 3 wherein the frame additionally comprises a pair of bars for supporting the optical component, the pair of support bars extending transversely across the window in an orthogonal relationship relative to one another.

5. The tool as claimed in claim 4 wherein each of the plurality of alignment posts is press-fit into a corresponding hole formed in the top surface of the frame.

6. A tool for use in manufacturing a liquid crystal display (LCD) stack-up, the LCD stack-up comprising a front glass and a rear glass that are affixed onto opposing surfaces of an LCD using silicone gel, the tool comprising:
   (a) a frame shaped to define a central window, the frame including a top surface and a bottom surface, the top surface being shaped to define a narrow shelf around the outer periphery of the central window, the narrow shelf being adapted to support the front glass,
   (b) a first set of pivots pivotally coupled to the frame, each of the first set of pivots capable of being rotated between a first position and a second position, and
   (c) a first shim coupled to each of the first set of pivots, each of the first shims protruding into the central window a predefined distance above the front glass when its corresponding pivot is disposed in its first position.

7. The tool as claimed in claim 6 wherein the each of the first shims is adapted to support the LCD a uniform distance away from the front glass.

8. The tool as claimed in claim 7 wherein each of the first set of pivots comprises,
   (a) an elongated lever which includes a top surface and a bottom surface, the bottom surface being shaped to define a recess that is sized and shaped to receive a portion of its associated shim, and
   (b) a cylindrical post formed on the bottom surface of the elongated lever, the cylindrical post being sized and shaped to fit within a corresponding bore formed in the top surface of the frame.

9. The tool as claimed in claim 8 wherein each of the first shims is retained within the recess formed in the bottom surface of its associated pivot by a pivot clamp.

10. The tool as claimed in claim 7 further comprising,
   (a) a second set of pivots pivotally coupled to the frame, each of the second set of pivots capable of being rotated between a first position and a second position, and
   (b) a second shim coupled to each of the second set of pivots, each of the second shims protruding into the central window a predefined distance above the LCD when its corresponding pivot is disposed in its first position.

11. The tool as claimed in claim 10 wherein each of the second shims is adapted to support the rear glass a uniform distance away from the LCD.

12. The tool as claimed in claim 11 further comprising a pair of corner pins mounted on the frame for retaining the LCD stack-up fixed in place on the tool.

13. A tool for use in affixing an optical component to a liquid crystal display using a silicone gel, the tool comprising:
   (a) a frame shaped to define a central window, the frame comprising,
      (i) a top surface,
      (ii) a bottom surface, and
      (iii) a plurality of tabs that extend partially into the central window, each tab comprising a step that is adapted to support the optical component, and
   (b) a plurality of alignment posts coupled to the frame.

14. The tool as claimed in claim 13 wherein the frame is a unitary device that is constructed of metal.

15. The tool as claimed in claim 14 each of the plurality of alignment posts is press-fit into a corresponding hole formed in a tab of the frame.

* * * * *

UNITED STATES PATENT AND TRADEMARK OFFICE
CERTIFICATE OF CORRECTION

PATENT NO. : 7,623,217 B2  Page 1 of 1
APPLICATION NO. : 11/487174
DATED : November 24, 2009
INVENTOR(S) : Barrow et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 699 days.

Signed and Sealed this

Twenty-sixth Day of October, 2010

David J. Kappos
*Director of the United States Patent and Trademark Office*